United States Patent
Silverstein

(10) Patent No.: US 10,951,756 B1
(45) Date of Patent: Mar. 16, 2021

(54) USER-CUSTOMIZED CALL FILTERING SYSTEM AND METHOD

(71) Applicant: Jonathan Silverstein, Weston, FL (US)

(72) Inventor: Jonathan Silverstein, Weston, FL (US)

( * ) Notice: Subject to any disclaimer, the term of this patent is extended or adjusted under 35 U.S.C. 154(b) by 0 days.

(21) Appl. No.: 16/809,238

(22) Filed: Mar. 4, 2020

Related U.S. Application Data

(60) Provisional application No. 62/968,315, filed on Jan. 31, 2020, provisional application No. 62/813,514, filed on Mar. 4, 2019.

(51) Int. Cl.
*H04M 3/436* (2006.01)
*H04M 3/42* (2006.01)
*H04M 3/533* (2006.01)

(52) U.S. Cl.
CPC ....... *H04M 3/436* (2013.01); *H04M 3/42059* (2013.01); *H04M 3/42161* (2013.01); *H04M 3/53391* (2013.01); *H04M 2203/2027* (2013.01); *H04M 2242/14* (2013.01); *H04M 2242/28* (2013.01)

(58) Field of Classification Search
CPC ............. H04M 3/436; H04M 3/42059; H04M 2242/48; H04M 3/53391; H04M 1/663; H04M 1/66
USPC ............ 379/210.02, 210.03, 201.01, 207.02, 379/207.03, 207.15, 211.01
See application file for complete search history.

(56) References Cited

U.S. PATENT DOCUMENTS

| | | |
|---|---|---|
| 4,488,005 A | 12/1984 | Frantz |
| 5,751,760 A | 5/1998 | Fuller et al. |
| 6,456,706 B1 | 9/2002 | Blood et al. |
| 8,380,503 B2 | 2/2013 | Gross |
| 9,060,057 B1 | 6/2015 | Danis |
| 9,553,985 B2 | 1/2017 | Cohen |
| 9,614,959 B2 | 4/2017 | Gonzales |
| 9,653,068 B2 | 5/2017 | Gross |
| 9,736,300 B2 | 8/2017 | Cook |
| 9,912,688 B1 | 3/2018 | Shaw et al. |
| 10,051,121 B2 | 8/2018 | Quilici et al. |
| 10,110,741 B1 | 10/2018 | Cohen et al. |

(Continued)

*Primary Examiner* — Thjuan K Addy
(74) *Attorney, Agent, or Firm* — John Rizvi; John Rizvi, P.A.

(57) ABSTRACT

A user-customized call filtering system and method for vetting and filtering incoming calls from unwanted callers including robocallers. The system and method includes a user-customized call filter software application hosted on a cloud-based system that communicates with a native call filter application stored on end-user devices including smart phones, over a wired or wireless communication network. The native call filter application includes a host of pages that are selected by and presented to, end-users to customize a blacklist and whitelist with telephone numbers associated with incoming calls that are unwanted and terminated, granted immediate access to end-users, or granted access to end-users based on predefined schedule filters that are defined by geographic location of originating callers, geographic location of end-users, and/or on a particular date, day, and/or time. The system and method includes a dynamic query engine that generates and presents queries to callers associated with unknown and unverified incoming calls to solicit human responses for determining whether such callers are human or likely robocallers.

20 Claims, 15 Drawing Sheets

(56) References Cited

U.S. PATENT DOCUMENTS

| | | |
|---|---|---|
| 10,194,022 B2 | 1/2019 | Cooper et al. |
| 2005/0185784 A1 | 8/2005 | Chin et al. |
| 2007/0041517 A1 | 2/2007 | Clarke et al. |
| 2016/0036868 A1* | 2/2016 | Brewer ................ H04M 7/123 370/352 |

\* cited by examiner

USER-CUSTOMIZED CALL FILTERING SYSTEM AND METHOD

CROSS-REFERENCE TO RELATED APPLICATION

This application claims the benefit of U.S. Provisional Patent Application Ser. No. 62/813,514, filed Mar. 4, 2019, and Provisional Patent Application Ser. No. 62/968,315 filed Jan. 31, 2020 which are incorporated herein in their entireties.

FIELD OF THE INVENTION

The present invention relates generally to telephonic communication systems, and more particularly, to a user-customized call filtering system and method for selectively vetting unwanted calls from individual callers including robocallers based on user-customized settings based on geographic location of end-users, date and time schedules, and responses to questions or directives generated by a dynamic query engine.

BACKGROUND OF THE INVENTION

Unwanted calls including robocalls have become a prevailing concern with the public at large. Receiving calls from unknown callers is often times annoying, disturbing, and most often unnecessarily interrupts daily living activities of called recipients. Calls associated with robocalls typically comprise machine-operated dialers that are preprogrammed to make numerous, anonymous calls to individual households including for example to promote telemarketing products or services, solicit participation in surveys, or gauge political stance in various elections or polls. Although such auto-dialing process are often targeted to recipients of particular race, age, and/or location, most calls do not differentiate age when calling individuals and often reach older, more fragile individuals that are vulnerable and fall prey to deceptive calling and sales practices. Advancements in mobile communication technology has enticed robocalling entities to expand their calling base beyond use of landline phones, to calling users or owners of mobile, electronic communication devices such as mobile or smart phones. Mobile phones are widely employed throughout the world to provide individuals with immediate accessibility to emails and texts, browse the internet, engage in social media, or simply to call friends and family. Mobile phones have given users the advantage of staying connected, at all times, with family and friends, and in immediate reach of receiving calls. With the advent of both wired and wireless communication, a greater number of individuals are now receiving a host of unwanted calls including robocalls.

In an effort to curb receiving annoying or unwanted calls including robocalls, individuals have often relied on caller ID services or devices that are engineering to help filter unwanted incoming calls. In practice, called recipients typically view incoming call numbers, associated with calling devices, to ascertain whether the incoming call number is one that is associated with a caller they recognize. Such filtering devices have provided limited resolve in the past because in practice many individuals do not have or subscribe to caller ID service, are inundated with too many incoming calls, or have difficulty associating or managing known from unknown call numbers. Called recipients often find themselves in a position of answering the incoming calls as a result of possibly missing an important call that may be related to a family emergency, or other important call. In addition, called recipients are not able to decipher whether incoming calls are made by actual humans or by automated machine robots.

A host of call blocking devices, and software applications have also been developed to better assist called recipients with unwanted calls. For example, some call blocking devices include electronic devices having a processor, memory, and a database that stores preprogrammed phone numbers associated with verified callers that are known by called recipients. Such devices often compare the incoming phone numbers with a list of allowed phone numbers that are stored in the database to grant access to called recipients. Though such electronic devices are compatible for use with landline phones, the call blocking devices are generally impractical for use with mobile or smart phones. To block unwanted incoming calls directed to mobile phones, companies have developed various call blocking software application programs that are made available for called recipients using mobile phones. Such call blocking software applications generally work on similar principles as call blocking devices that are used with landlines, in that phone numbers associated with incoming calls are compared to a list of pre-stored phone numbers that are deemed verified and acceptable by called recipients.

It is well known that robocallers use deceptive calling practices in an effort to overcome restrictions provided by call blocking devices and/or call blocking software applications. For instance, one technique involves using a greater number of calling numbers that are used to overcome pre-stored blocking list of numbers, and prevent called recipients from being familiarized with incoming call numbers. As such, a person may receive a robocall associated with one telephone number, and shortly thereafter, receive the same robocall that is associated with a different telephone number. Using different telephone numbers to call individuals makes it difficult, if not impossible, for end users to keep track of incoming numbers when preprogramming call blocking devices, or software application used on mobile phones. Another deceptive practice employed by robocallers involves spoofing a telephone number of a person or company living in the same geographical area as call recipients to effectively camouflage the identity of robocallers, and pretend that the calling party is a person, or company that call recipients recognize as being legitimate local callers. Called recipients viewing the incoming call recognizes the incoming telephone number as being associated with a known local resident, or party associated with a local business or entity, believing that a legitimate attempt in calling the called recipient is being made thereby enticing called recipients to pick up the phone. As such, previous strategies for robocallers relying on using multiple telephone numbers is now being replaced with the practice of spoofing calls to deceive recipient callers in actually believing calls are being made from a local, legitimate callers. Spoofing has gained momentum over the years, and has become another arsenal used by robocallers in luring individuals to answer the phone. Spoofing calls makes it extremely difficult for called recipients to add spoofed numbers to blocking lists as such numbers are typically associated with well-known, verified callers and doing so would effectively wanted communication between trustworthy calling parties.

Still another drawback of call filtering or blocking prior art devices or systems is the inability or ineffectiveness to ascertain whether the calling party is human or machine, and to restrict incoming calls based on the location of a caller. Most prior art directed at call filtering or blocking uses various algorithms based on time cycles, audible tones, background noise, or call cycles to determine whether calls are made from humans or machines. Such techniques require sophisticated programming, are unreliable, and often inaccurate. No mechanism is provided to engage the caller to better ascertain whether the calling party is human or not. Also, most prior art associated with call filtering or blocking considers only call numbers associated with callers when determining unwanted calls and does not take into consideration the location from which the call is being placed. Unwanted calls may originate from other cities, or countries. As such, call recipients are not able to filter or block incoming calls based on user-customized caller location settings.

Accordingly, there is an established need for a solution to at least one of the aforementioned problems. There remains a need for a user-customized call filtering system and method to easily, and quickly selectively block or filter unwanted calls and/or text messages from unwanted callers including robocallers based on user-customized settings including geographic location of callers, end-users, and/or date, day and time, and a blacklist, and that effectively determines whether incoming calls are human generated calls by using a dynamic query engine that generates and presents queries to callers to solicit and determine human responses versus robocallers.

SUMMARY OF THE INVENTION

The present invention is directed to a user-customized call filtering system and method for selectively filtering and blocking unwanted calls from unverified callers including robocallers based on user-customized settings including user customized blacklist, a whitelist with selective scheduled filters including a geographic location filter, and/or date, day and time filter, and includes a dynamic query engine that generates and presents queries to callers associated within incoming calls to solicit live human responses to determine whether callers are robocallers. The user-customized call filtering system and method comprises a cloud-based system hosting a user-customized call filtering software platform stored in a computer-readable memory and executed by one or more processors, where the cloud-based system receives requests, comprising signals associated with telephone numbers corresponding to one or more calling devices, over a communication network, to communicate with end-user devices. The user-customized call filtering system communicates with a native call filter application downloaded onto end-user devices to filter or block telephone numbers prestored in a blacklist and a whitelist that includes schedule filters. A dynamic query engine generates and presents queries to callers associated with incoming calls to solicit human responses. The native call filter application allows users to customize the blacklist with telephone numbers generated by a contact, call log, message log, and incoming call functionality. The native call filter application permits users to filter text messages when selecting SMS messaging, via a text-blocking feature.

Introducing a first embodiment of the invention that provides a user-customized method of filtering calls, said method comprising: hosting a user-customized call filter application platform on a cloud-based system where the call filter application software is stored in a computer-readable memory and executed by one or more processors on one or more servers communicating with databases, where the cloud system receives incoming call requests, generated by calling devices over a communication network, to communicate with end-user devices including a call filter native application, where the incoming call requests is associated with telephone numbers generated by the calling devices, end-users customizing the call filter native application to create call lists including prestored telephone numbers that are compared to incoming call requests to filter the incoming call requests, where the method includes a schedule filter associated with one of the call lists for selectively receiving incoming calls based on a geographic location of the calling devices, end-users, or a date and time, and a dynamic query engine that generates a verification filter presented to callers associated with the incoming call requests that do not correspond to telephone numbers on the call list to solicit verified human responses from callers to selectively allow communication access of one or more incoming call requests to end-user devices, and wherein incoming call requests corresponding to telephone numbers provided in one of the call lists are immediately terminated and logged in a call log.

In one aspect, the calling devices include a telephonic communication device including a smart phone, a mobile phone, a landline phone, VOIP, or a cell phone.

In one aspect, a schedule filter associated with a geographic location includes a geographic range selection that allows end-users to select a geographic range in which to receive incoming call requests that are known and verified, and that originate within the selected geographic range, and/or that allows end-users to select a geographic range in which to receive incoming calls from designated group or family members when end-users are within the selected geographic range of the end-users' geographic location. Another schedule filter associated with a geographical location allows end-users to block or restrict incoming calls from various countries, states or cities as well. A country, state and/or city of origin tab or icon permits end-users to make selections among a list of countries, states, and/or cities provided in a drop down menu.

In another aspect, a schedule filter associated with a date and time includes a date and time selection that allows end-users to select a date and time in which to receive incoming call requests that are known and verified, and that originate within the date and time selected.

In another aspect, a schedule filter associated with a date and time includes a date and time selection that allows end-users to select a date and time in which not to receive incoming call requests that are known and verified, and that originate within the date and time selected.

In one aspect, the call lists include a blacklist including telephone numbers associated with incoming calls that are deemed unwanted and unverified, and a whitelist including telephone numbers associated with incoming calls that are deemed wanted, and verified.

In one aspect, the dynamic query engine includes any of: 1). a question and answer filter in which callers are asked one or more questions and callers given answers are compared to correct answers prestored in one or more look-up tables; 2). a mathematical computation challenge in which callers are asked to solve one or more mathematical problems, such as what is the sum of two numbers; 3) a phrase, sentence, word, numbers, or letters recognition filter in which callers are asked to repeat certain phrases, sentences, words, numbers or letters when prompted; and 4) a caller directive option employed to instruct callers to perform a certain task.

In yet another aspect, the call filter native application includes a host of pages presented to end-users including a sign-in page, a dashboard page, a blacklist page, a whitelist page, a black list overlay page including operators associated with a contacts page, a call log page, a message log page, a from input page, a number contains page, and a message contains text page, a group page, a schedule page, a schedule overlay page including operators for a schedule filter associated with a geographic location page, and a date and time page.

In one aspect, the geographic location page includes a geographic selector adjustable by end-users for selectively adjusting a geographic range to receive incoming call requests that originate within the selected geographic range, and/or receive incoming calls from group and/or family members when end-users are within a selected geographic range of end-users geographic location.

In another aspect, the dashboard page includes functionalities associated with a blacklist, a whitelist, a call log, a schedule filter, a group, settings, notification, billing, share this application, feedback, help and logout.

In one aspect, the method includes creating a voicemail greeting stored in a voicemail prompt database where incoming call requests are selectively routed to the voicemail greeting upon callers associated with incoming call requests correctly providing answers to queries generated from said dynamic engine, upon incoming call requests corresponding to telephone numbers provided in said whitelist and not associated with a schedule filter, or upon incoming call requests corresponding to telephone numbers provided in said whitelist, and satisfying rules of a created schedule filter.

Introducing a second embodiment of the invention that provides a user-customized call filter system for filtering unwanted calls, said system comprising: a cloud system hosting a user-customized call filter application platform stored in a computer-readable memory and executed by one or more processors on one or more servers and including databases and a dynamic query engine, where the cloud system receives requests, generated by calling devices over a communication network, to communicate with end-user devices, where the requests comprise signals representing telephone numbers associated with the calling devices, where the user-customized call filter application communicates with a native call filter app provided on the end-user devices for comparing telephone numbers of incoming calls to telephone numbers prestored in call lists to selectively allow the calling devices to communicate with the end-user devices, where the dynamic query engine generates at least one verification filter that is presented to callers associated with the calling devices to solicit a verified human response from the callers to selectively allow communication access of the calling devices to the called devices upon receiving a correct response to the verification filter, and immediately terminating incoming calls upon receiving an incorrect response to the verification filter.

As yet another example, disclosed is A user-customized call filter system for filtering unwanted calls, said system comprising: a cloud system hosting a user-customized call filter application platform stored in a computer-readable memory and executed by one or more processors on one or more servers and including databases and a dynamic query engine;

wherein the cloud system receives requests, generated by calling devices over a communication network, to communicate with end-user devices;

wherein the requests comprise signals representing telephone numbers associated with the calling devices;

wherein the user-customized call filter application communicates with a native call filter app provided on the end-user devices for comparing telephone numbers of incoming calls to telephone numbers prestored in call lists to selectively allow the calling devices to communicate with the end-user devices;

wherein the dynamic query engine generates at least one verification filter that is presented to callers associated with the calling devices to solicit a verified human response from the callers to selectively allow communication access of the calling devices to the called devices upon receiving a correct response to the verification filter, and immediately terminating incoming calls upon receiving an incorrect response to the verification filter;

wherein the system is assembled to be capable of executing a method of:

hosting a user-customized call filter application platform on a cloud-based system;

wherein the call filter application software is stored in a computer-readable memory and executed by one or more processors on one or more servers communicating with databases;

wherein the cloud system receives incoming call requests, generated by calling devices over a communication network, to communicate with end-user devices including a call filter native application;

wherein the incoming call requests are associated with telephone numbers generated by the calling devices;

wherein end-users customize the call filter native application to create call lists including prestored telephone numbers that are compared to incoming call requests to filter the incoming call requests;

wherein the method includes a schedule filter associated with one of the call lists for selectively receiving incoming calls based on a geographic location of the calling devices, based on end-users, or based on a date and time, and a dynamic query engine that generates a verification filter presented to callers associated with the incoming call requests that do not correspond to telephone numbers on the call list to solicit verified human responses from callers to selectively allow communication access of one or more incoming call requests to end-user devices;

and wherein incoming call requests corresponding to telephone numbers provided in one of the call lists are immediately terminated and logged in a call log.

In another aspect, the calling devices include a telephonic communication device including a smart phone, a mobile phone, a landline phone, VOIP, or a cell phone.

In another aspect, a schedule filter associated with a geographic location includes a geographic range selection that allows end-users to select a geographic range in which to receive incoming call requests that are known and verified, and that originate within the selected geographic range, and/or that allows end-users to select a geographic range in which to receive incoming calls from designated group or family members when end-users are within the selected geographic range of the end-users' geographic location.

In another aspect, another schedule filter associated with a geographical location allows end-users to block or restrict incoming calls from various countries, states or cities.

In another aspect, a schedule filter associated with a date and time includes a date and time selection that allows end-users to select a date and time in which to receive incoming call requests that are known and verified, and that originate within the date and time selected.

In another aspect, a schedule filter associated with a date and time includes a date and time selection that allows end-users to select a date and time in which not to receive incoming call requests that are known and verified, and that originate within the date and time selected.

In another aspect, the call lists include a blacklist including telephone numbers associated with incoming calls that are deemed unwanted and unverified, and a whitelist including telephone numbers associated with incoming calls that are deemed wanted, and verified.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a user-customized call filtering system and method for selectively filtering and blocking unwanted or unverified calls based on user-customized settings including schedule filters associated with a whitelist, and a black list, and includes a dynamic query engine that generates and presents questions to callers associated with incoming calls to solicit human responses to filter out robocallers. The user-customized call filtering system and method comprises a cloud-based system hosting a user-customized call filtering software platform stored in a computer-readable memory and executed by one or more processors, and in communication with a native call filter application provided on end-user devices, over a communication network. End-user navigate a host of pages provided by the native call filter application to filter unwanted calls. For illustrative purposed only, the term, "end user" as referred to herein means a called individual, a group of individuals, a business entity, establishment or facility, or an individual receiving incoming calls, or associated with an electronic device employed for receiving incoming calls.

Figure 1:
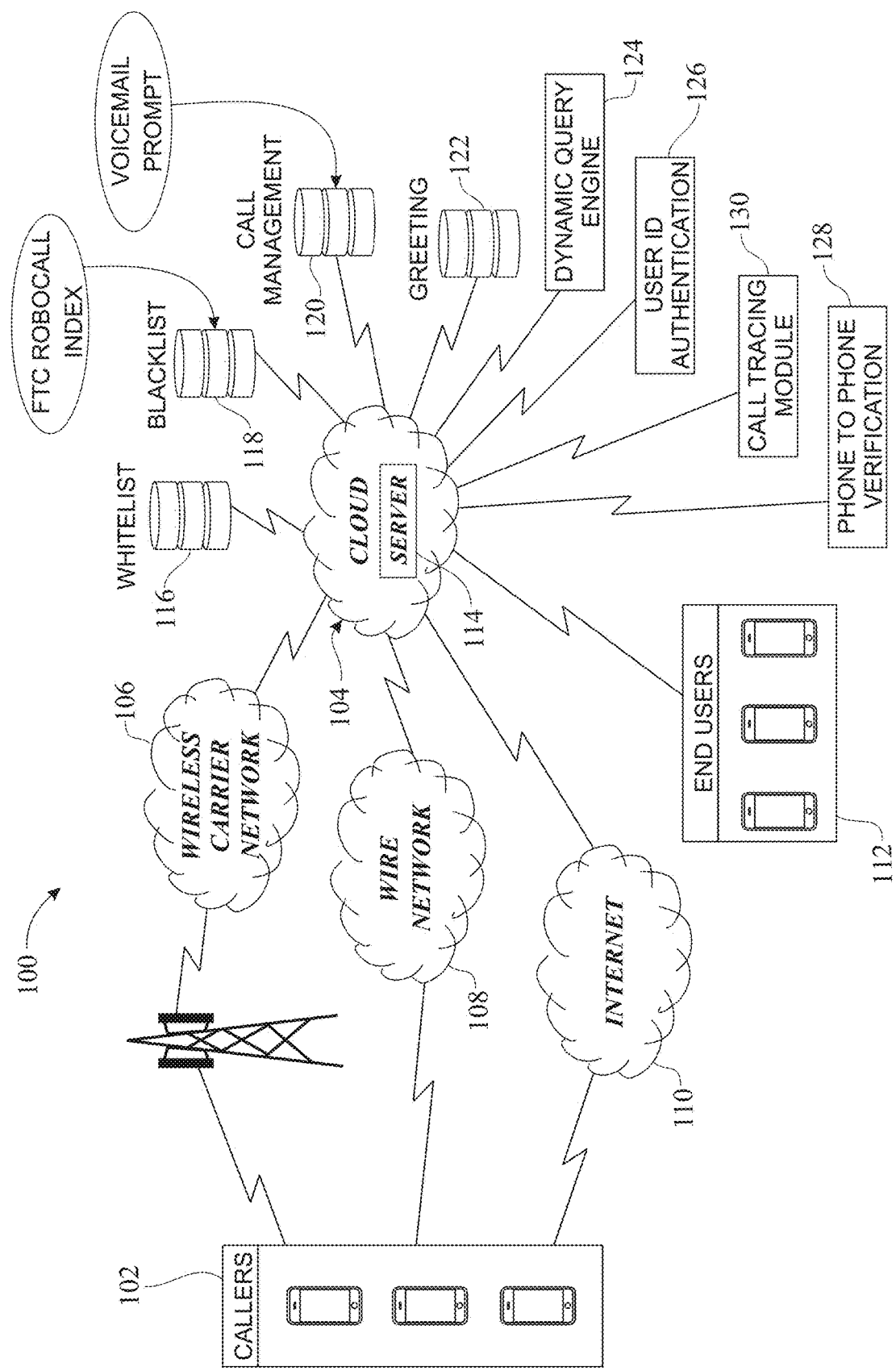
FIG. 1 presents a graphical representation of a user-customized call filtering system showing caller and end-user electronic devices, such as a mobile phones, in electrical communication with a cloud-based server hosting a user-customized call filtering platform, via communication networks, for filtering unwanted calls, in accordance with one embodiment of the present invention.

Referring now to FIG. 1, there is shown a graphical representation of a user-customized call filtering system and method (hereafter referred to as UCCF system) in accordance with an embodiment of the present invention. The UCCF system and method 100 includes one or more electronic devices 102, associated with callers, in electrical communication with one or more end-user devices 112 via a cloud-based system 104 hosting a user-customized call filtering software platform (UCCFP), over electrical communication networks 106, 108, and 110. Devices 102, 112 generally comprise handheld mobile or smart phones but may also comprise tablets, computers, laptops, and landline phone devices as well. Each device 102, 112 includes all necessary electronic components needed for communicating with the cloud-based system 104, and with each other. As such, devices 102, 112 include audio and video or electronic visual display circuitry, input such as a keyboard or touchpad, memory, one or more processors, I/O interface or API, RAM, ROM provided for accessing and visually navigating through the hosted UCCFP hosted on one or more cloud-based servers 114. Devices 102, 112 may comprise thin client hardware for use in service-as-a-system configurations, and client software including any of cloud access agents, web browsers, graphical user interface, and phone operating systems. For exemplary purposes, devices 102 are associated with calling parties or callers, and devices 112 with end-users or called recipients. Thus, devices 102 may represent phones or phone systems or devices used by any calling party including a person, or machine-operated robo-callers. All incoming calls initiated by such devices 102 are filtered before being routed to intended end-user devices 112.

Each electronic communication device 102, 112 is configured to communicate with the cloud-based system 104 and server 114 hosting the UCCFP via, a wireless network 106, a wired or landline network 108, or a VOIP (voice over internet protocol) network over the internet 110. Communication networks 106, 108, 110 may include any of, a WLAN (wireless local area network, such as Wi-Fi (IEEE 802.11)), WPANS (wireless personal area networks, such as Bluetooth (IEEE 802.15), Infrared, ZigBee), WMAN (wireless metropolitan area network, such as WiMAX (IEEE 802.16)), WWAN (wireless wide area networks, internet), and GAN (global area network), a telephone network, (e.g., analog, digital, wired, wireless, PSTN (public standard telephone network), ISDN, or XDSL, a mobile wireless communication system, such as 3G, 4G, or newly developed 5G, an internet-protocol based communication system, a radio frequency network (RF), a cable network, a satellite network, an optical network, and an internet or intranet network, where each network is adapted for transmitting, and receiving data, information, audio, video, texts, folders, and files between devices 102, 112 and the cloud-based system 104. It is understood that each communication network 106, 108, 110 includes all necessary communication or information exchange equipment, components or peripherals, including, but not limited to, one or more base stations, one or more servers, routers, switches, repeaters, towers, antennas, Ethernet hubs, wired or wireless data pathways, modems, or gateways to name a few. In one embodiment, data communication, or data tunneling occurring between devices 102, 112, and networks 106, 108, and 110, may be encrypted using any well-known encryption process or protocols to secure the transmitted information, data, video, or messages. For example, a few exemplary forms of encryption include IPsec, or secure sockets layer (SSL), and symmetric or asymmetric encryption.

The cloud-based system 104 includes one or more servers 114 for hosting the UCCFP software. The one or more servers 114 may be provided on or accessible by the cloud-based system 104. Each server 114 comprises one or more computers, I/O and/or network interfaces, processors, memory, and necessary computer readable medium for storing, processing, operating, sharing, transferring, and receiving, data, files, videos, images, audio, and other information, and for performing computations, hosting web pages and/or web applications, maintaining and communication with databases, processing software application source code, and other operatives associated with the UCCFP software functionalities. In one non-limiting example, the one or more servers 114 may comprise an application server, a web server, a computing server, a communications server, a database/file server, a mail server, a proxy server, or other additional servers. The cloud-based server 114 can be managed, controlled and operated by a designated entity, business, internet service provider, or third party business entity. As such cloud-based server 114 may be managed by any of an application service provider (ASP) offering on-demand software or software as a service, a network service provider (NSP), an internet service provider (ISP), a managed service provider (MSP), or a telecommunication service provider (TSP) where providers can charge ongoing subscription or fixed service fees, if any, to users. Server 114 includes memory that may include static random access memory (SRAM), synchronous dynamic RAM (SDRAM), nonvolatile/flash-type memory, or any other type of memory. Machine-executable program instructions or computer application programs associated with the UCCFP software may be stored on one or more machine readable mediums, including but not limited to, optical disk, magnetic or optical card or tape, flash memory, CD/DVD-ROM, memory dongle, magnetic storage media such as a hard drive or any other external machine-readable medium coupled to server or server computer via, I/O interface. Computer-accessible medium may include any volatile or non-volatile media such as RAM (e.g. SDRAM, DDR SDRAM, RDRAM, SRAM, etc.), ROM, EEPROM, or EPROM.

The UCCF system 100 includes a series of databases 116, 118, 120, and 122 each hosting, storing, indexing, filing, and managing information and data associated with filtering unwanted calls from individuals including robocallers. Each database 116, 118, 120, 122 is in electrical communication with the cloud-based server 114, and includes, or has accessible communication or storage capacity with, internal or external storage comprising any of floppy or optical disks, CD-ROM, flash memory or USB storage devices, or other machine readable medium suitable for storing computer source code, instructions, data tables, look-up tables, files, data, information, or folders. It is appreciated that both the server(s) 114, and the databases 116, 118, 120, 122 is made part of, is separately distinct from, the cloud-based system 104. It is also understood that such databases 116, 118, 120 may also be included as part of each end-user device 112. Thus, databases 116, 118, 120 can be provided on the cloud-bases system 104 and accessed by end-user devices 112, or can be provided in each end-user device 112.

A whitelist database 116 includes a list of electronic identifiers that are known, and pre-verified for immediate access to end-user devices 112. Electronic identifiers include for example, but are not limited to, a mac address, an IP address, a mobile identification number (MIN), a phone number, a software identifier, and a mobile substantive identification number (MSIN). For illustrative purposes only, reference made herein is to electronic identifiers that comprise telephone numbers associated with calling party devices 102. The whitelist database 116 includes a file, folder and/or index manifest, or one or more look-up tables, or any combination thereof. The whitelist database 116 includes an index of prestored or preprogramed telephone numbers associated with calling party devices 102 owned by friends, family members, or trusted companies, third parties, or individuals. Telephone numbers that are stored in the white list database 116 are electronic identifiers deemed automatically verified by end-users assuring called recipients that such incoming calls are legitimate and originate from known, verified, and trusted callers. In practice, telephone numbers of incoming calls associated with calling party devices 102, are compared to telephone numbers previously stored within the whitelist database 116 to ascertain whether the incoming calls are verified or possibly unwanted. Index or look-up tables may comprise a number of indexes or tables that correlate to, or are associated with, particular attributes relating to friends, groups, family relatives, or businesses, etc. . . .

The UCCF system 100 includes a blacklist database 118 that comprises a list of prestored telephone numbers associated with calling party devices 102 that are deemed suspicious, non-verified, suspect, spoofed calls, or unwanted calls that originate from calling devices 102. In practice, a host of unwanted telephone numbers are manually or automatically prestored in the blacklist database 118. A machine-learning module may be implemented to learn or automatically recognize incoming telephone numbers that are deemed suspect or highly suspicious and automatically reroute such numbers to a dynamic query engine 124 for further review of the calling party identity. The blacklist database 118 further includes a listing of known robocallers made available by the Federal Trade Commission.

A call management database 120 manages calls, message logs, or activity reports of all incoming calls, including calls that have been terminated or dropped, been granted access to end-user devices 112, and/or rerouted to the voicemail prompt 122. For example, call logs or activity reports may include telephone numbers itemized according to time of day, date, name, geographic location of originating call, names of callers, or other pertinent information and data including a reason as to why incoming calls were filtered or dropped, type and frequency of verification or scheduled filters used, and whether callers are on a predesignated list. The call management database 120 may also include information accessible by end-users, and relating to materials for educating or informing end-users about robocallers, robocalling state and federal laws, rules, and regulations, methods for preventing robocallers, and/or to helpful information, solutions, or contact information when dealing with robocallers. Such helpful data or information may include forms, videos, audio, tutorials, or written materials relating to robocalling practices and solutions. Other information may teach individuals or walk them through steps on how to seek relief or compensation from known robocallers.

The user-customized call filtering system 100 includes a voicemail greeting database 122 that includes predefined, and/or user-customized, voice messages, or greetings that are generally presented to unwanted, or unverified callers. The voicemail greeting database 112 may be used by end-users for a host of reasons. In one example, incoming calls associated with verified callers are typically granted immediately access to end-user devices. However, end-users may have programmed their end-user device 112 to direct or route all incoming calls, or incoming calls associated to certain callers, to the voicemail greeting database 122 to hear personal greetings, a voicemail, or other audible instructions, or directives. In another embodiment, incoming calls from unwanted and unverified callers that are not listed in the whitelist database 116 may be directly routed to the voice greeting database 122. For instance, an incoming call that is known to be a robocaller, or an unverified caller can be directly routed to the voicemail greeting database 122 in an effort to further vet such incoming calls. In yet another embodiment, incoming calls that have not successfully provided a corrective or proper response to a question generated and presented by a dynamic query engine 124 may also be routed directly to the voicemail greeting database 122. The voicemail greetings database 122 may include messages like, please do not disturb, we do not accept calls from unverified callers, or please call Jim, or please provide your contact or identification information, or any other type of voice audible generated greeting that may be affiliated with certain characteristics, profiles, or attributes of end user groups, memberships, interests, profiles, or geographic locations. In one embodiment, end-users may access the UCCFP and via, an authentication process, edit, create, customize, or delete voicemail greetings at any time. In one non-limiting embodiment, voicemail greetings may be automatically generated based on a known identify of incoming calls. For example, if an incoming call is from a known, verified caller such as a friend, and the end-user has selected to activate a voicemail greeting upon receiving calls from that friend, when the known, verified friend calls in, the person is automatically directed to a voicemail greeting generated by the voicemail greeting database 122. The voicemail greeting may be specifically directed to that particular friend, or may comprise a general greeting intended for all friends. Thus, in one embodiment, users may customize voicemail greetings for particular individuals, groups of individuals, or for unverified, unwanted calls.

A beneficial feature of the UCCF system and method 100 includes a dynamic query engine generally denoted at 124 that is used to engage or solicit communication, in real-time, from callers in an effort to identify and verify whether such callers are spoofed calls, calls associated with robocallers, or calls that originate from humans. The dynamic query engine 124 solicits participation of callers to ascertain attributes from such callers including their identity, reason for calling, profile, or to ascertain the nature of the call, and whether to give callers access to end-user devices, or to route such incoming calls to the voice greeting database 122 for further vetting. Generally, robocallers comprise electrical machines that are void of human mental faculties, capacity or communication. The dynamic query engine 124 presents predetermined and stored, or user-customized verification query filters designed to solicit human interaction from callers in an effort to verify whether the callers are human, or unwanted, machine robocallers. Examples of verification query filters include: 1). questions that are presented to unverified callers to solicit answers that are compared to correct, prestored answers. For example, what do the initial U.S. represent; 2). a mathematical computation challenge that are presented to unverified callers to solve where mathematical answers are compared to correct, prestored answers. For example what is the sum of three and three; 3) provide a phrase(s), sentence(s), word(s), number(s), or letter(s) to callers and ask such callers to recite or repeat the phrase(s), sentence(s), word(s), number(s) or letter(s) when prompted; and/or 4) provide calls a directive that instruct callers to perform a certain task. For example, a directive option may include, if you are Mr. Smith please press one, or if you are not Chuck, please press three. Another directive option may instruct callers to enter a specific combination or sequence of keys that are randomly generated by the dynamic query engine, or customized by users to solicit the caller's entry of instructed sequence of keys. For instance, callers may be prompted to enter a sequence of keys such as one, four, and eight. The dynamic query engine 124 randomly generates the verification filters presented to callers. For example, a mathematical computation challenge can be changed every minute, hours, or day, with new mathematical challenges, a question and answer session may follow a caller direction option, or a phrase recognition filter may be used three consecutive times in one hour, followed by a sequential key entry instruction. As such, presenting different verification filters to callers makes it difficult for robocallers to adopt a machine-learning approach in recognizing or learning types, times, or changes of verification filters presented. Callers who respond correctly to verification filters are deemed verified humans and may be granted, upon selection from end-users, access to end-user devices 112. If callers do not respond to such verification filters correctly, such calls are immediately disconnected, or routed to the voicemail prompt 122 and denied immediate access to end-user devices.

A user identification and authentication module 126 is employed to authenticate the identity of callers and determine whether the caller is a person who is authorized to use the device 102, or is the true owner of the calling device 102. To address this concern, system 100 requires callers to authenticate the use of the device 102 itself, and authenticate accessibility to the UCCF software platform. The authentication module 126 includes authentication protocols such as, but not limited to, a single-tier, two-tier, or multi-tier authentication protocol process, tokens, digital certificates, or biometric authentication using one or more sensors embedded within, or provided separately for use with, calling devices 102. Such embedded sensors may sense fingerprints, hand geometry, iris or retinal patterns, facial features, hand gestures, or voice sampling or recognition. One well-known form of authentication protocol comprises a two-tier system often including username and password. User device authentication may occur at the device 102 itself where the device 102 includes built-in login technology and authentication components to verify that callers are calling from a mobile phone which utilizes authentication technology, or alternatively, authentication may occur on the cloud-based system 104 that hosts authentication software where the electronic device 102 transmits authentication information to the UCCFS platform to authenticate the information transmitted from the device 102. For example, a caller may use a mobile phone to take a picture of the person's face, or a fingerprint sensor to scan fingerprints, where the photo or fingerprints are then uploaded onto the cloud-based system 104 for authentication. The UCCF platform communicates with the device 102 to verify the caller's identity and is not a robocaller.

The UCCF system and method 100 further includes a phone-to-phone verification module 128 for identifying calling devices 102 to also help determine whether incoming calls are associated with robocallers. For example, in one non-limiting embodiment, the phone-to-phone verification module 128 is configured to receive any of a caller's Mac address, a unique IMEI number identifying the make, model and serial number of the calling device 102, an International Mobile Subscriber Identity (IMSI) number which is the international standardized unique number to identify a mobile subscriber, or an IP address associated with VOIP calls that are made over the internet 110. The received numbers or addresses are analyzed to confirm that callers are not using spoofed numbers.

A pinged or trace signal generator 130 is employed to help identify incoming calls by automatically generating a return call, or automatically transmitting a pinged signal to calling devices 102 to map or trace incoming calls to determine if the calling party is actually calling from the device 102 identified, and/or to determine the geographic location of the device 102. For example, the signal generator 130 may send an SMS, an email, or a voice prompt to solicit a ping location response. The SMS text may include a code reviewable by calling parties to enter into a validation prompt to verify and validate identity of the calling party.

In one embodiment, end-users may access a designated website via, a universal resource code locator (URL) to download a native call filter application (NCF APP) onto end-user devices 112. The NCF APP includes a series of program interfaces API that allow users to navigate and communicate with the UCCF software platform that is hosted on the cloud-based system 104. For example, one or more program interface screens are navigated by users to view, edit, insert, amend, navigate, print, set-up, delete, register, transmit, or store, any data, files, folders, pictures, telephone numbers, videos, audio, forms, profiles, verification filters, or any information, input or data relating to the NCF APP and/or UCCF software platform. The one or more interfaces may employ any of, toggle buttons, drop-down menus, tabs, task-based icons, menus, query boxes, collapsible bars or banners, dashboards, tools, or other web-based interfacing, that is organized, structured, formatted, or developed for accessible use by subscribed users, or allowed users. The API can be engineered and designed to include a specific layout of operative features that are presented to users in a particular format or manner.

Upon launching the NCF APP, end-users are presented a screen shot of a sign-in page 200 to begin the process of filtering incoming calls and/or texts, and to access the user-customized call filtering software platform hosted on the cloud-bases system 104. The sign-in page 200 includes, in one non-limiting embodiment, a two-tier authentication protocol that uses sign-in credentials attributed to an end-user's email address or mobile phone number 202 in one tier, and a password 204 in another tier. End-users may sign-in through social media including for example, Facebook®, Twitter®, or Google Play®, illustrated at 206. Non-registered users may also sign up for the first time if they have not already established an account. Such sign-in credentials may comprise other forms including for example, use of CAPT-CHA, bio-authentication, tokens, digital certificates, or use of electronic identifiers associated with end-user device 112. The authentication protocol may include any format including for example, password authentication protocol (PAP), challenge-handshake authentication protocol (CHAP), or extensible authentication protocol (EAP). Type of services provided may be based on an authenticated hierarchy basis. For example, amount of services rendered or accessible may be cost driven where more services made available for use by end-users is proportional to service fees. Thus, authentication protocols may be associated with the types of services paid for, the service fee paid, or any combination thereof.

Upon authenticated access to the NCF APP, authorized end-users are directed to a screen shot of a dashboard page 300 that includes a plurality of operators or functionalities denoted at 302 for effectively filtering or blocking unwanted and/or unverified incoming calls. The plurality of operators 302 includes, in one non-limiting example, a blacklist, a whitelist, a call log, a schedule, a group, settings, notification, billing, sharing of app, feedback, help and a log out function. The dashboard page 300 also includes profile information associated with the end-user 304. Such profile information may be provided upon registering as a first time user and can be edited anytime via, and edit profile icon 306.

Figure 4:
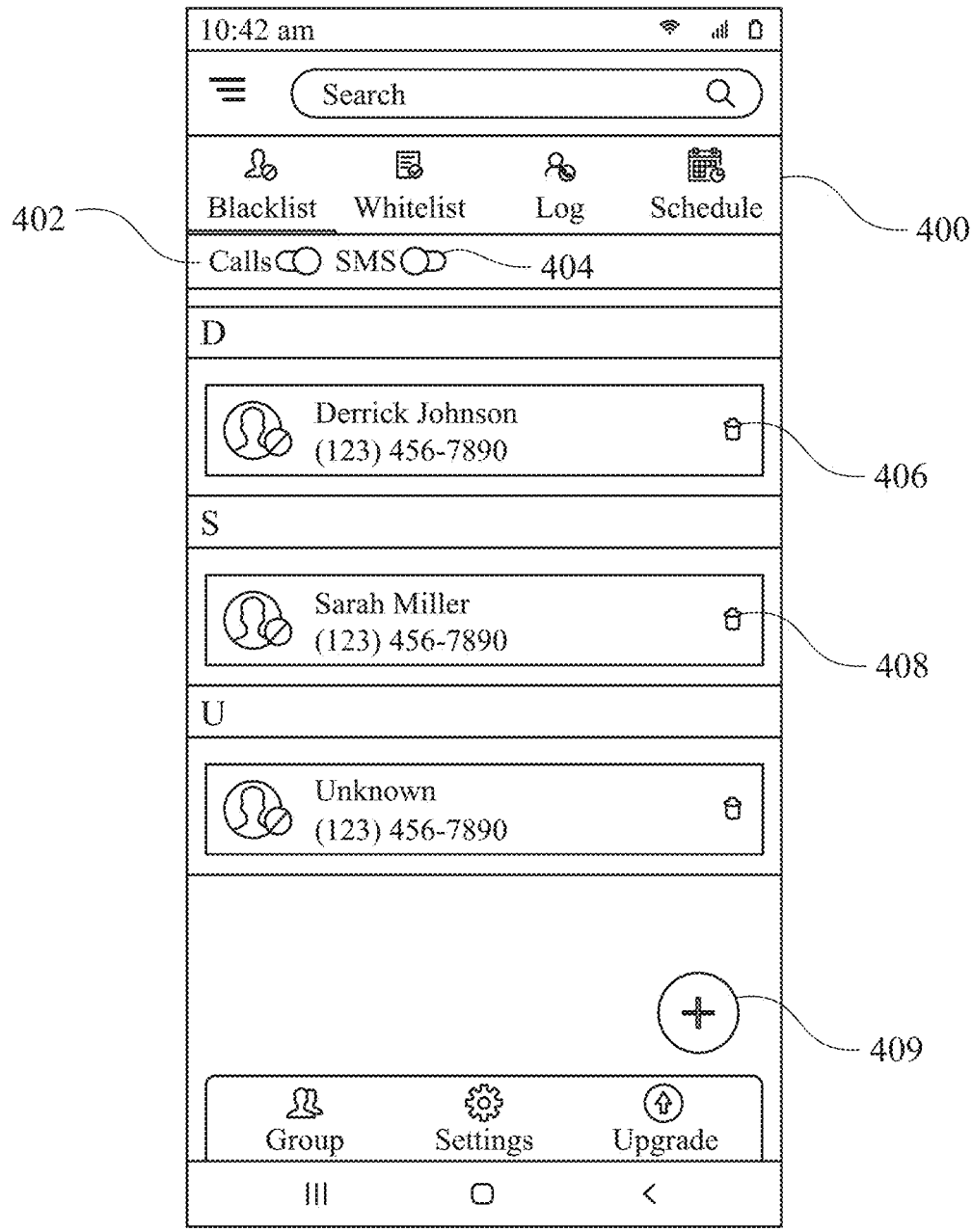
FIG. 4 presents a screen shot of a blacklist page, showing a list of telephone numbers associated with calling devices deemed unwanted and/or unverified calls and restricted from accessing end-user devices.

End-users navigate through the list of operatives 302 provided on the dashboard page 300 to interact with the NCF APP to effectively block or filter unwanted or unverified calls that are initiated from caller devices 102, as shown in FIG. 1. In do so, end-users generally begin customizing the call filtering process by generating a blacklist via, a blacklist page 400 illustrated in FIG. 4. The blacklist is tailored to filter or block unwanted or unverified phone numbers of callers associated with known and unwanted, or unknown individuals, parties, or entities, including robocallers from gaining access to end-user devices 112 including smart phones. The blacklist page 400 allows users to selectively filter or block unwanted and/or unverified phone calls by activating a toggle call button 402, or filter and block unwanted and/or unverified texts by activating a toggle SMS button 404. A list of pre-customized and prestored phone numbers is generated in alphabetical order for added convenience. The blacklist page 400 allows end-users to add any phone number that is associated with unwanted or unverified callers including robocallers via, a caller add icon 409. The blacklist may also include, or have access to a database that includes, a robocall index including a list of phone numbers that are known robocallers that is provided by the Federal Trade Commission.

Figure 5:
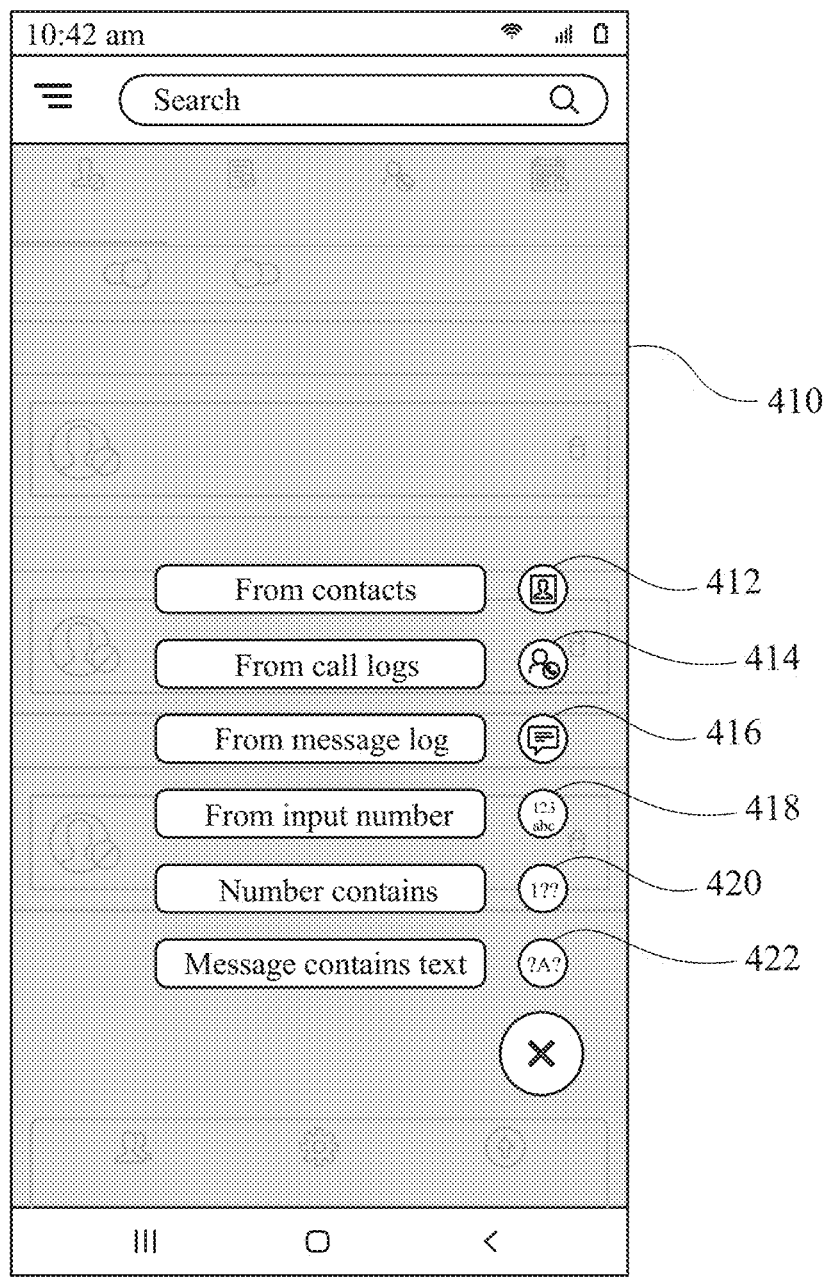
FIG. 5 presents a screen shot of a blacklist overlay page, showing various functionalities from which users can select telephone numbers and/or text messages from certain callers to store in the blacklist where functionalities include contacts, call logs, a message log, an input number, number contains, and a message contains text.
Figure 6:
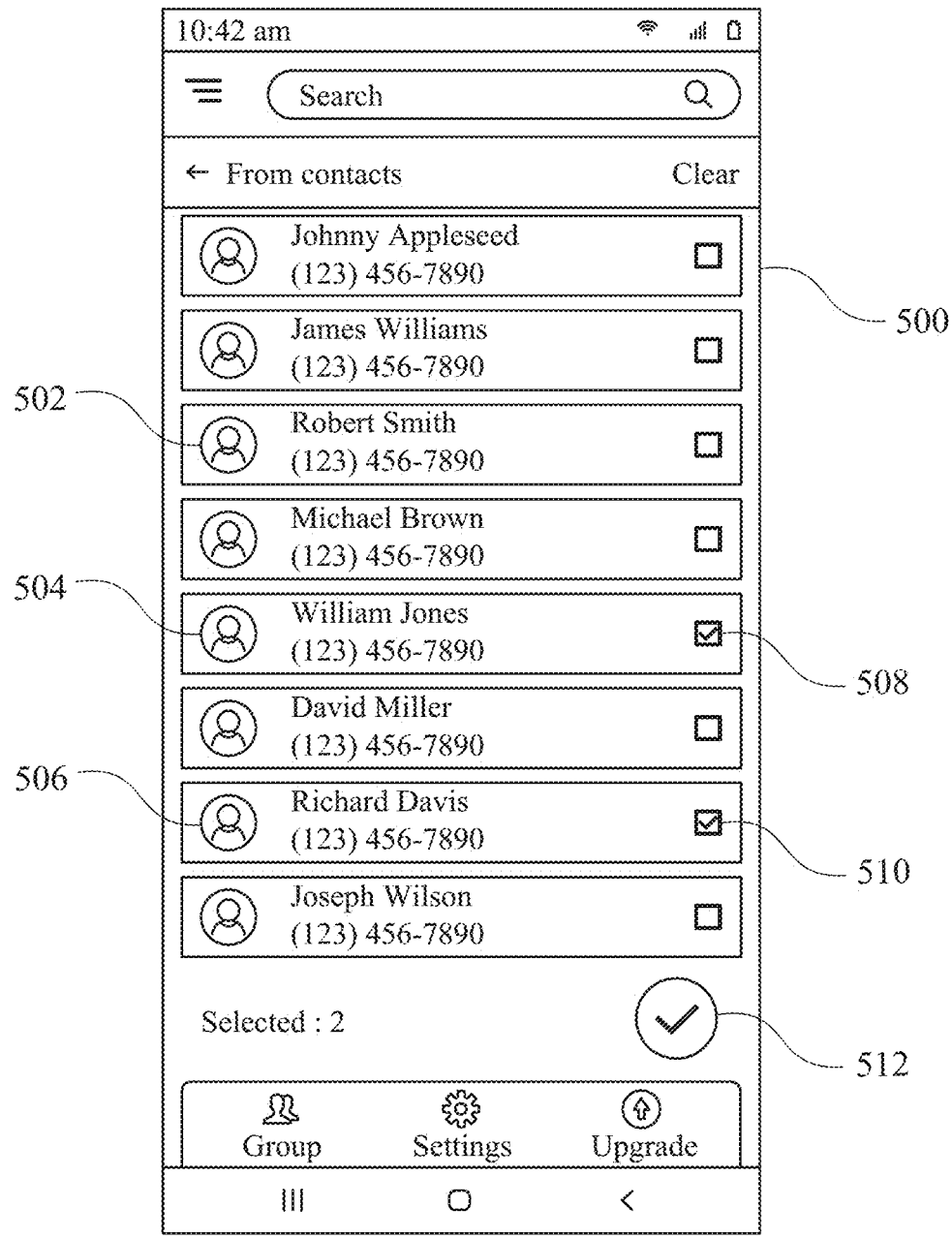
FIG. 6 presents a screen shot of a contacts page associated with the contacts functionality of FIG. 5 to permit end-users to select phone numbers associated with telephone numbers of callers listed in contacts to add to the blacklist to filter such telephone numbers.

Upon activating the add icon 409 (represented as a plus symbol), end-users are provided with an overlay page 410 as illustrated in FIG. 5. The overlay page 410 allows end-users to populate the blacklist with phone numbers and/or text messages associated with known, unwanted, or unverified callers using various modalities including in one non-limiting example, contacts 412, a call log 414, a message log 416, and/or from a list of input numbers 418. Choosing the modality identified as contacts 412 on the overlay page 410, directs end-users to a contact list page 500, illustrated in FIG. 6. The contact list page 500 generally includes a plurality of phone numbers that are associated with individual friends, family, or other known callers. As shown in FIG. 6, the contact list includes individual names that are each associated with a phone number as depicted for illustrative purposes at 502, 504, and 506. End-users populate or customize the blacklist by selecting individuals from the contact list. End-users may restrict, filter or block any calls emanating from such selected individuals by simply checking the box that corresponds to each person as shown at 508 and 510. Once selection is made, end-users activate the accept icon as represented by mark 512. Upon adding the selected individuals, the phone numbers associated with selected individuals 504, 506 will be automatically stored in the blacklist to block calls, originating from the selected individuals 504, 506, from gaining access to end-user devices 112. End-users may access the contacts functionality 412 to add or remove phone numbers at any time.

End-users may also filter or block phone numbers and/or text messages of incoming calls and/or texts, based on call logs, 414, a message log 416, from an input number 418, a number contains 420, and/or a text message or part of a text message contains 422 functionality. In one illustrative example, upon selecting, the number contains 420 functionality, end-users may enter a sequence of numbers that are susceptible, considered, or known to correspond to an unwanted or unverified caller. For instance, if a phone number associated with an unwanted call or robocaller includes particular numbers or digits that correspond to an area code, end-users may enter the sequence of numbers in the number contains 420 data insert box where all incoming calls having an area code that matches with the prestored sequence of numbers are automatically dropped, and routed to the voicemail prompt 122, or are routed to the dynamic query engine for further vetting.

Figure 2:
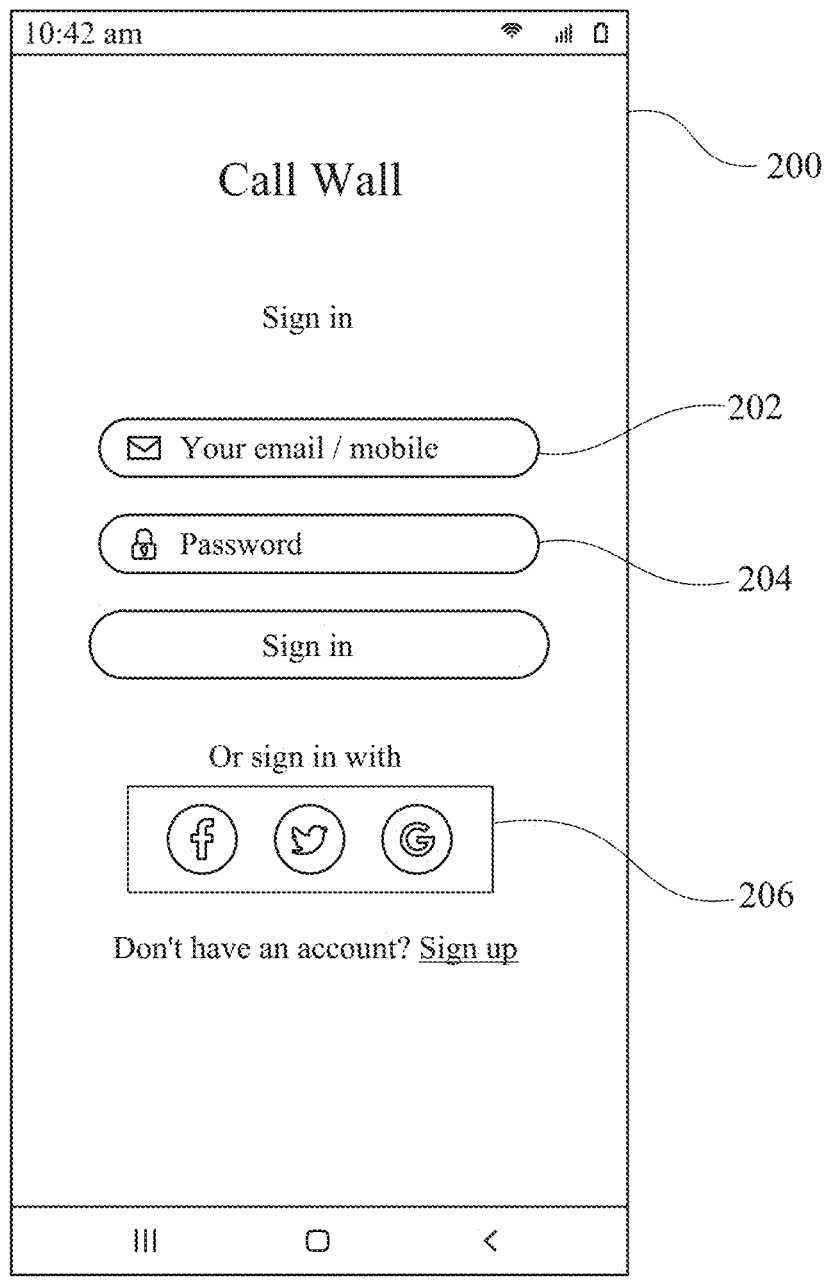
FIG. 2 presents a screen shot of a sign-in page for accessing the user-customized call filtering application platform, and native call filter application provided on end-user devices.
Figure 7:
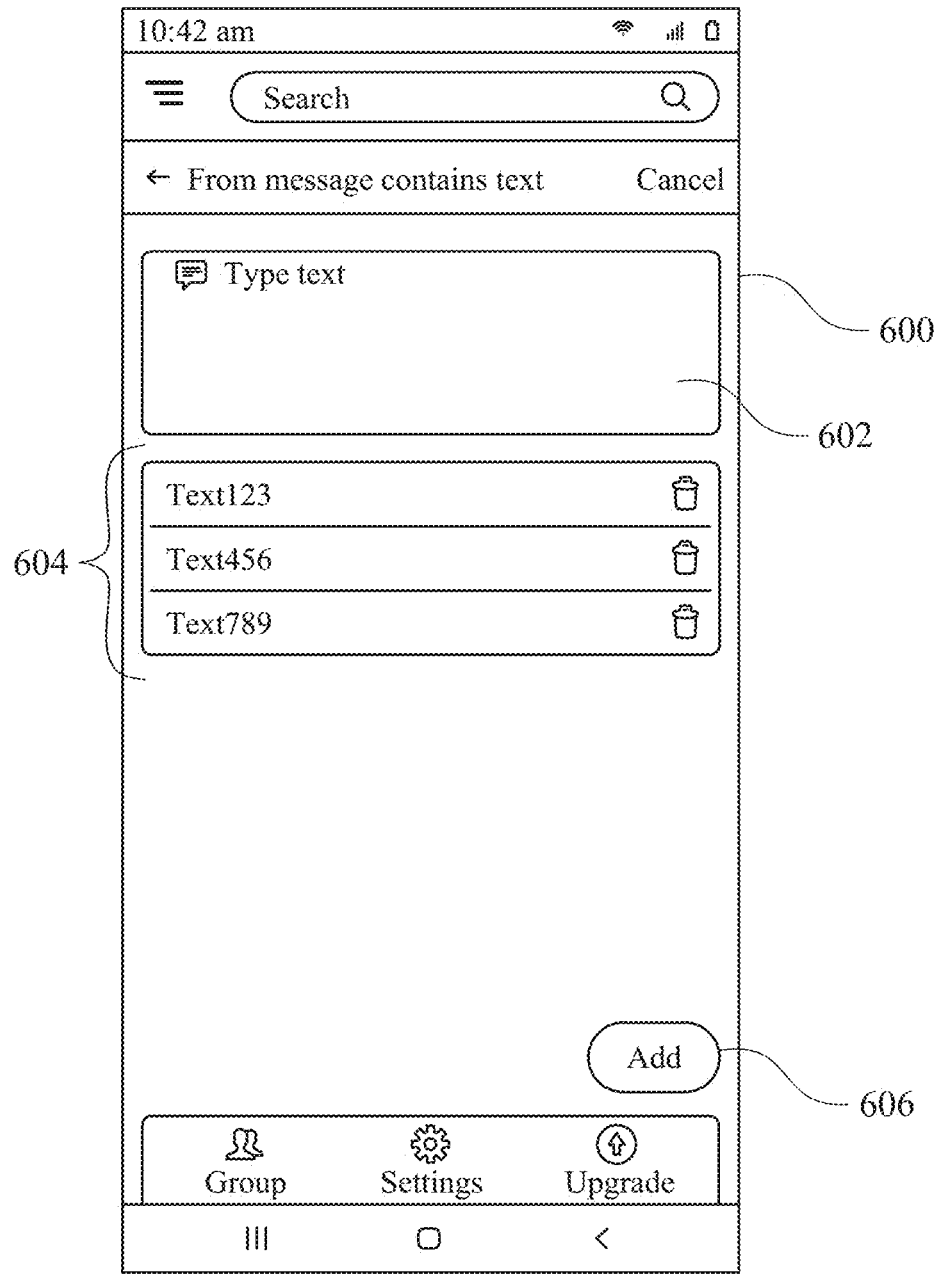
FIG. 7 presents a screen shot of a message contain text page, showing a list of text messages previously stored and designated for filtering.

When selecting the message contains text 422 functionality presented in overlay page 410, end-users are directed to a message contains text page 600, as illustrated in FIG. 7. A data input box 602 is presented for end-users to enter text words associated with unwanted text messages, or voicemail messages. Thus, end-users customize the blacklist page 400 to filter or block incoming text messages that contain words or phrases entered in the data input box 602, and readily prestored in the blacklist by end-users. Any number of text messages are prestored, as illustrated at 604 in FIG. 7 using add icon 606. It is understood that each prestored text message 604 may include a corresponding box that allows end-users to select or deselect which text message 604 to block, similar to checked boxes 508, 510 shown in FIG. 6. It is understood that the blacklist may be populated with information, data, phone numbers, or text messages that are provided in emails, calendars, memos, or social media forums. Thus, overlay page 410 may include additional operators or functionalities that allow prestoring information from emails, calendars, memo, and from social media where selecting such a social media operator may direct end-users to a social media overlay page that includes social media operators including those provided at 206 in FIG. 2.

Figure 3:
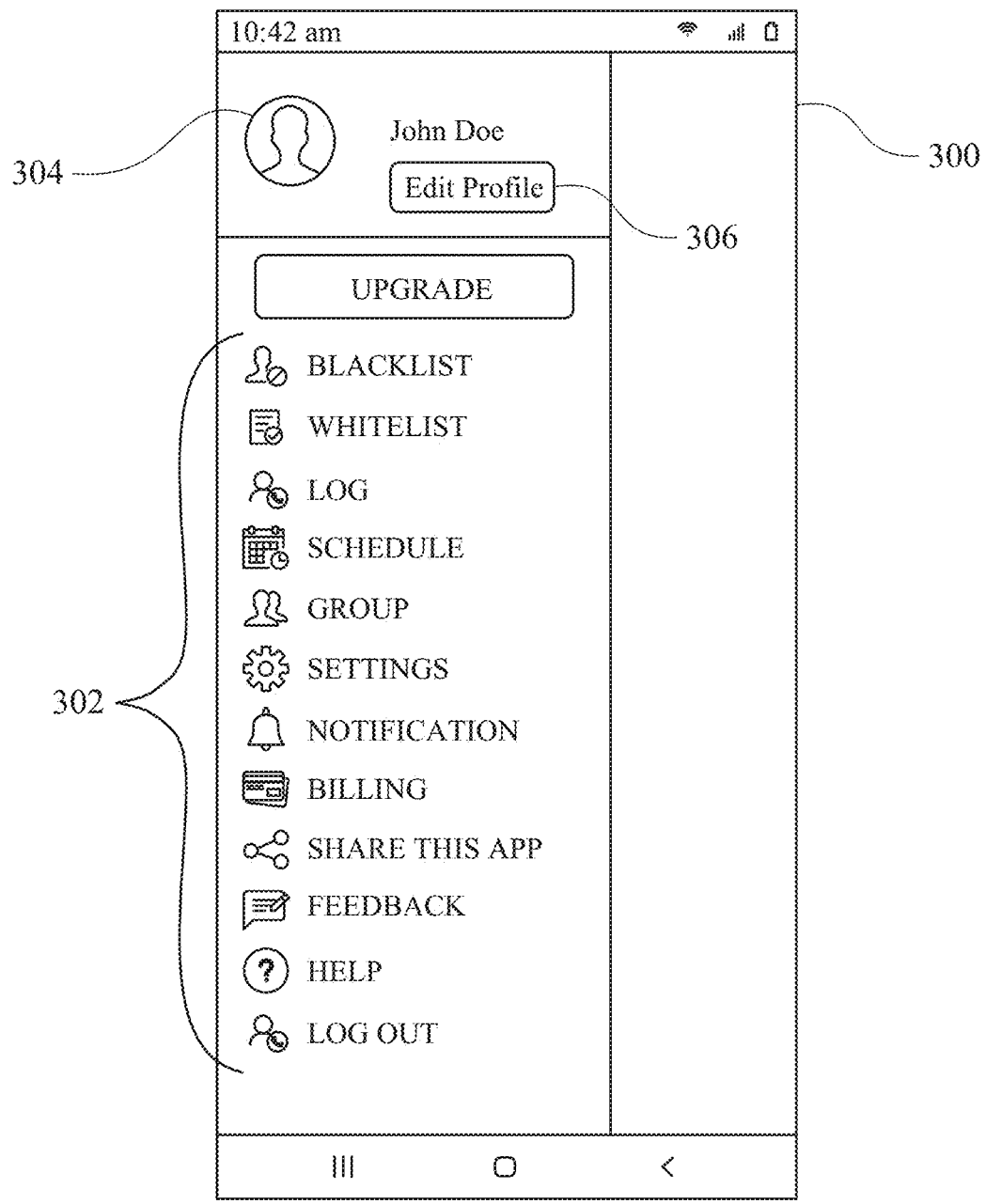
FIG. 3 presents a screen shot of a dashboard listing a host of operatives including a blacklist, a whitelist, a call log, a schedule, a group, settings, notification, billing, sharing of app, feedback, help and a log out function.
Figure 8:
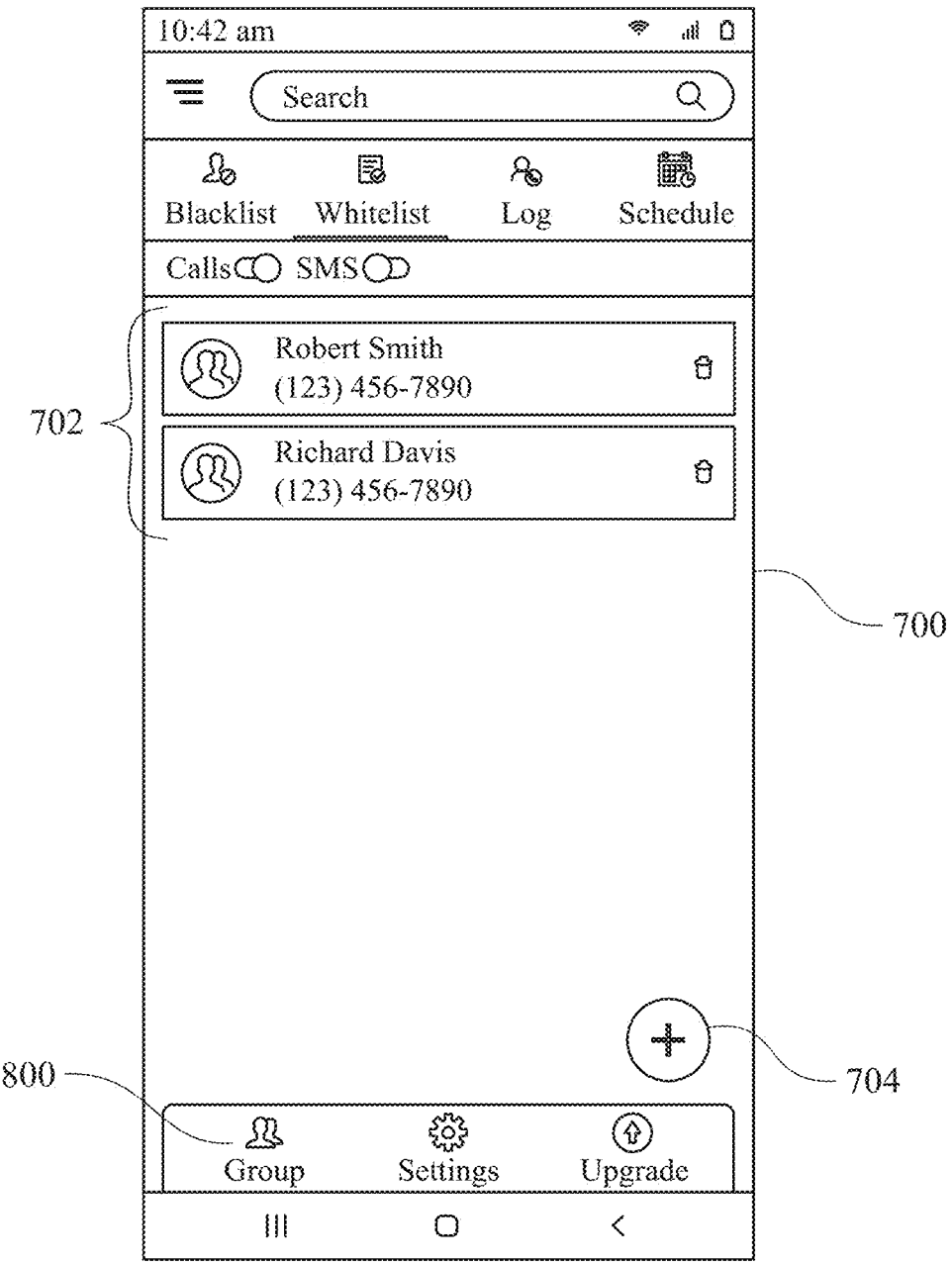
FIG. 8 presents a screen shot of a whitelist, showing a list of callers and phone numbers associated with callers that are deemed known, verified, and given direct access to end-user devices based on created, scheduled filters.
Figure 9:
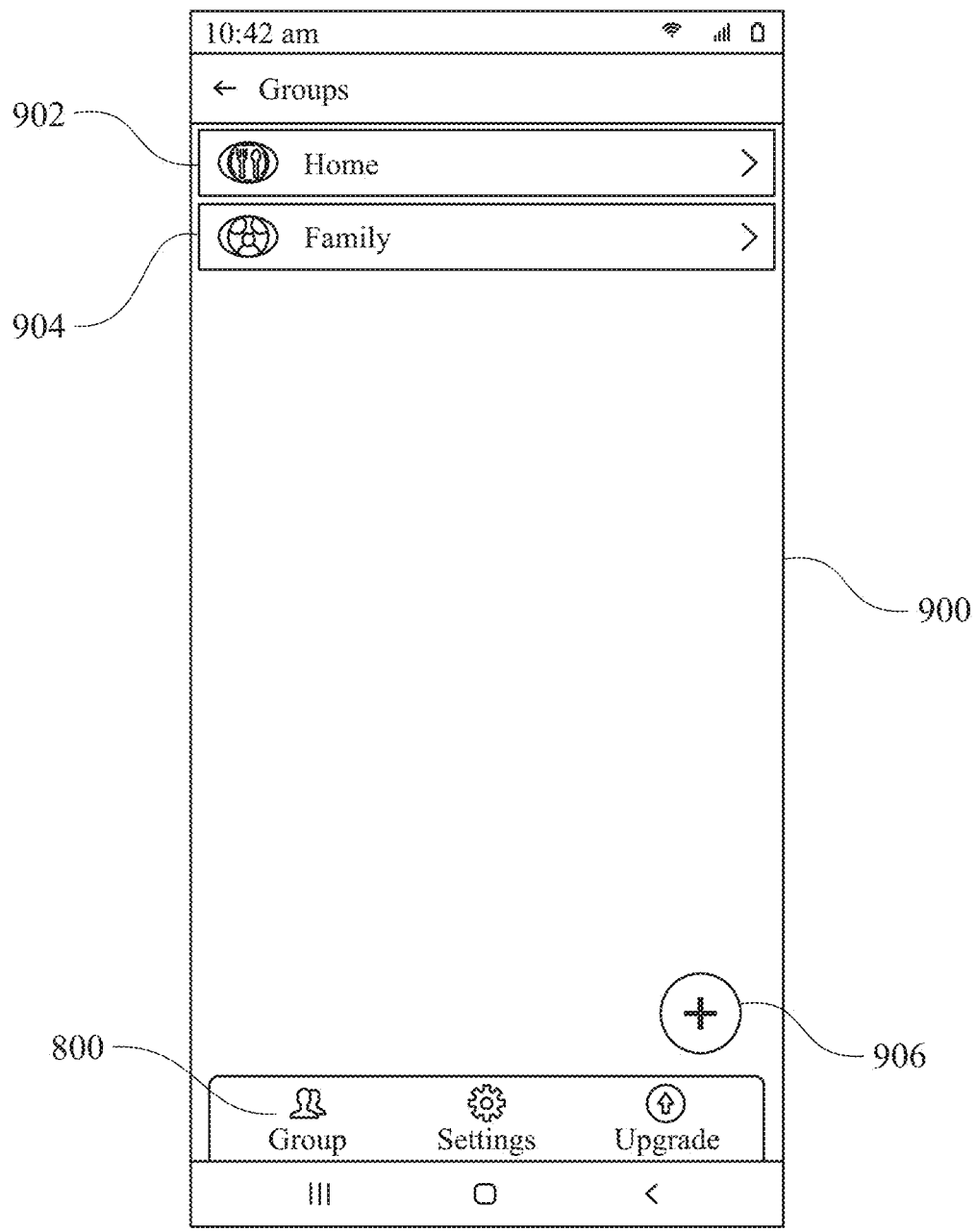
FIGS. 9 and 10 present screen shots of a group page, and create group page for creating groups of individuals associated with calling telephone numbers deemed known, and verified, and given direct access to end-user devices based on created, scheduled filters.

Turning to FIGS. 3 and 8, the NCF APP also provides a whitelist operative to provide a whitelist page denoted at 700 in FIG. 8. The whitelist page 700 includes a list of phone numbers prestored by end-users, and associated with calling devices owned or used by known, trusted, and/or verified callers 702 including for example, close friends, family members, doctors office, affiliated group members, or work related colleagues. Incoming calls including phone numbers listed on the whitelist are either immediately directed to end-user devices 112, or are routed to a voicemail prompt 122 in the event calls from such callers are tagged with a schedule filter setting. Any number of phone numbers and/or text messages are added in the whitelist via, add icon 704.

Figure 12:
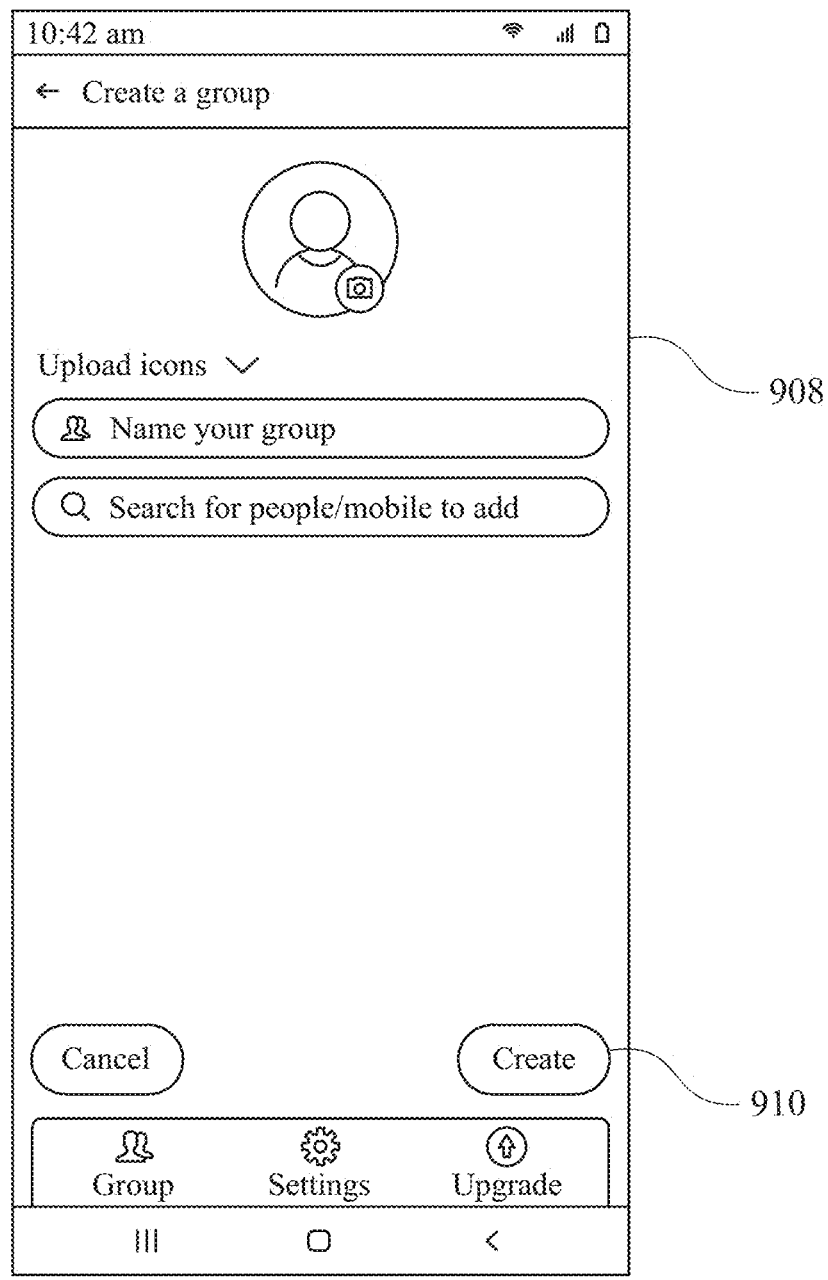

As shown at the bottom of the page 700 in FIG. 8, a group icon or tab 800 directs end-users to a group page denoted at 900 in FIG. 12. Group page 900 includes previously created groups of individuals characterized as a home group 902, and a family group 904. Each group 902, 904 includes one or more phone numbers of known or verified individuals. Any number of groups may be added via, a group add icon 906. Upon selecting the group add icon 906, end-users are directed to a create group page 908 where end-users can customize the names, and profile information of each group member. For instance, phone numbers of individual family members can be stored in a group 904 characterized as family. Other exemplary forms of group identification may include religious groups, political party groups, groups affiliated with the rotary club, or chamber of commerce, includes individuals involved in sports or teams, or members of various clubs to name a few. Multiple groups are easily created by activating the group create icon 910 shown in FIG. 10.

Figure 11:
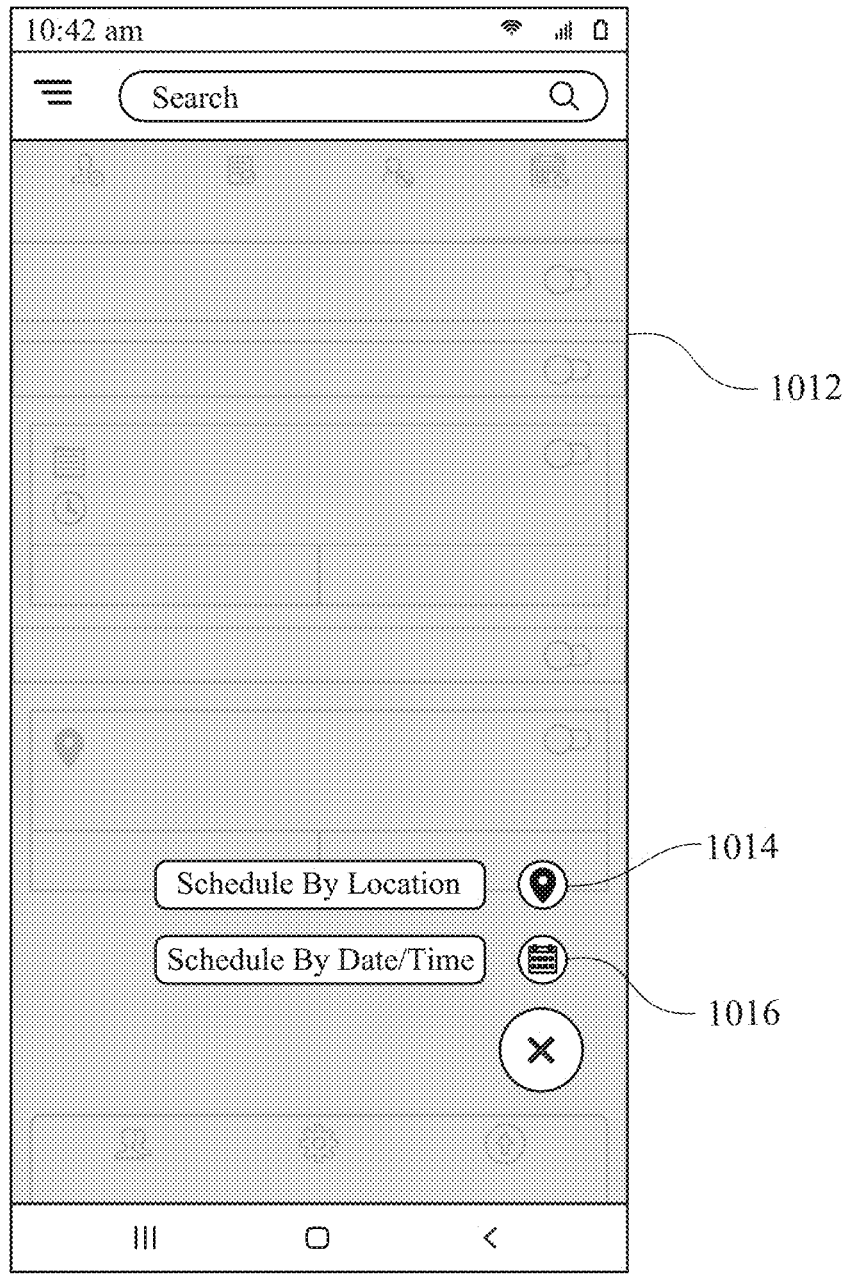
FIGS. 11 and 12 present screen shots of a schedule list page, and schedule list overlay page including schedule filters, respectively, where schedule filters are based on geographic location of incoming calls, and/or on geographic location of end-users, and a scheduled date and time for receiving incoming calls.

The whitelist highlighted in the whitelist page 700 is governed by a set of rules that define schedule filter settings that allow end-users to customize when they wish to receive calls and/or from what geographical location calls originate, as illustrated in FIGS. 11-14. The schedule filter setting provides a schedule page 1000 that includes a schedule toggle button 1002 which activates schedule filters for receiving calls from individuals listed according to created groups shown in one embodiment as a family group 1004, and a home group 1006 where each group includes phone numbers of known, verified individual callers prestored in the whitelist. As shown in FIG. 11, each group 1004, 1006 includes a corresponding schedule toggle button 1008, 1010, respectively, to selectively apply a schedule filter to one or more phone numbers associated with incoming calls. Upon activating schedule toggle button 1002, and 1008, end-users are directed to an overlay schedule page 1012 that gives end-users the ability to set a schedule filter for incoming calls based on geographic location via, location icon 1014, and on one or more dates and times via, date and time icon 1016.

Figure 10:
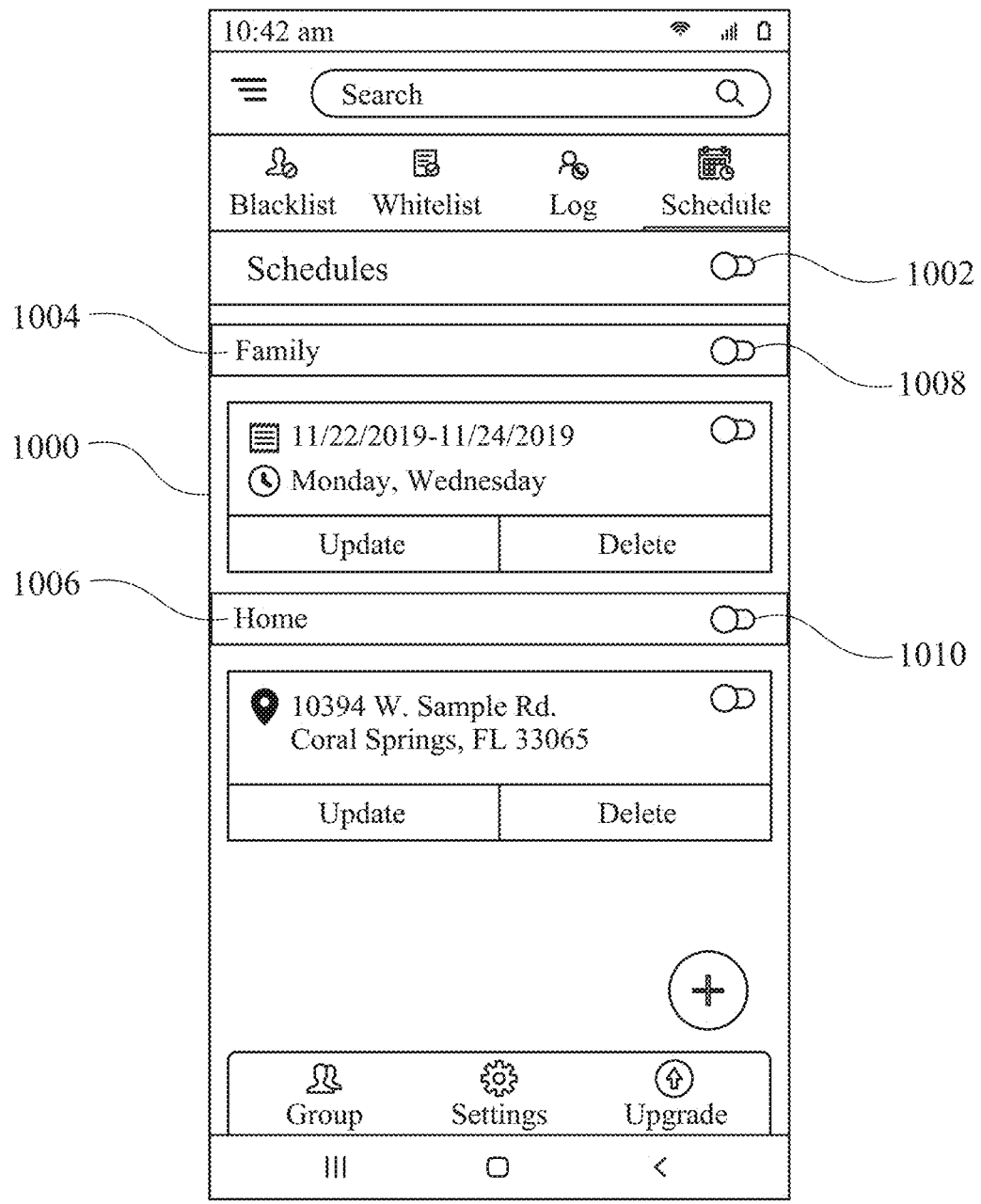
Figure 13:
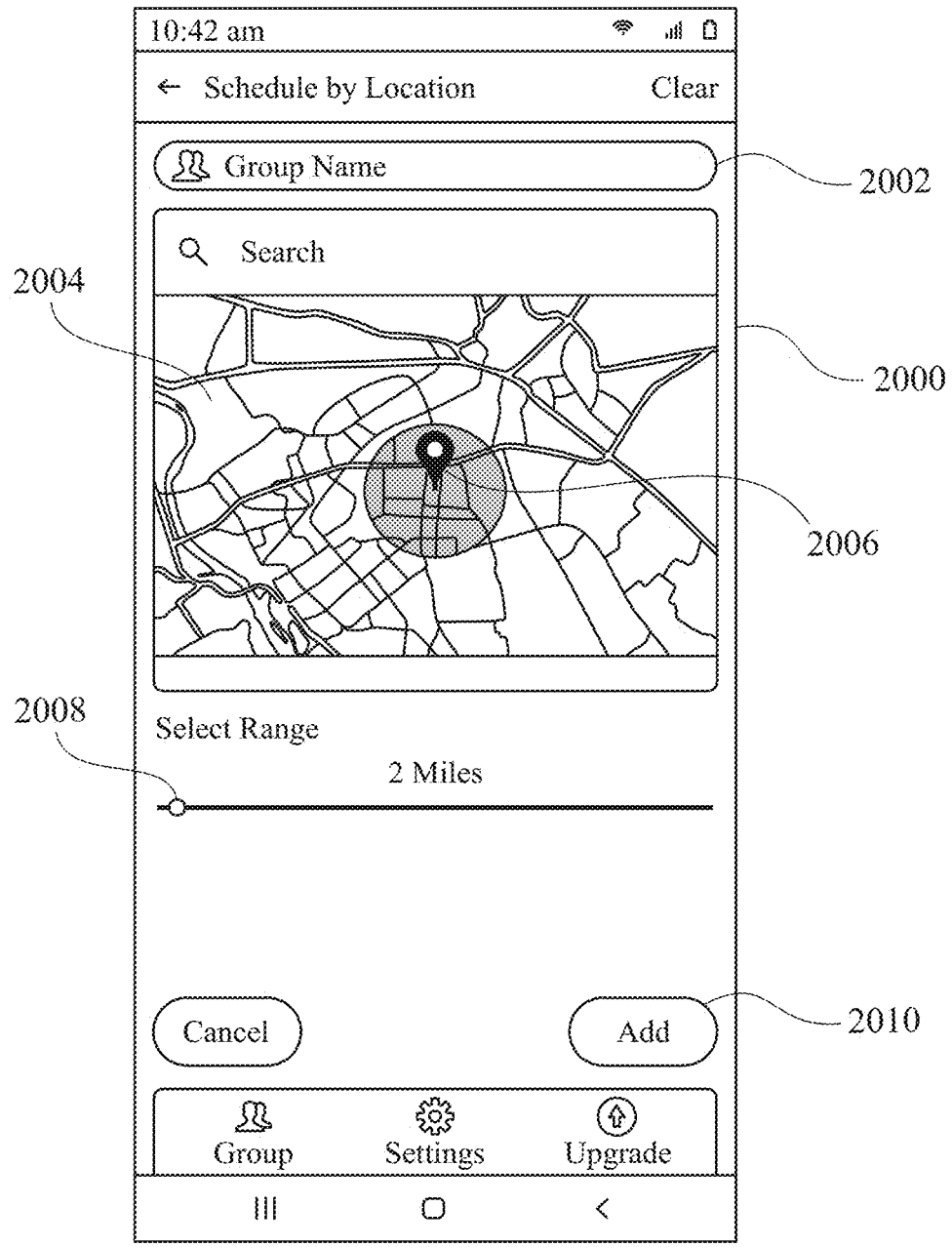
FIG. 13 presents a screen shot of a schedule by location page associated with selecting the geographic location operator in FIG. 12, to customize a geographic range from which originating incoming calls are deemed acceptable and routed to end-users.
Figure 14:
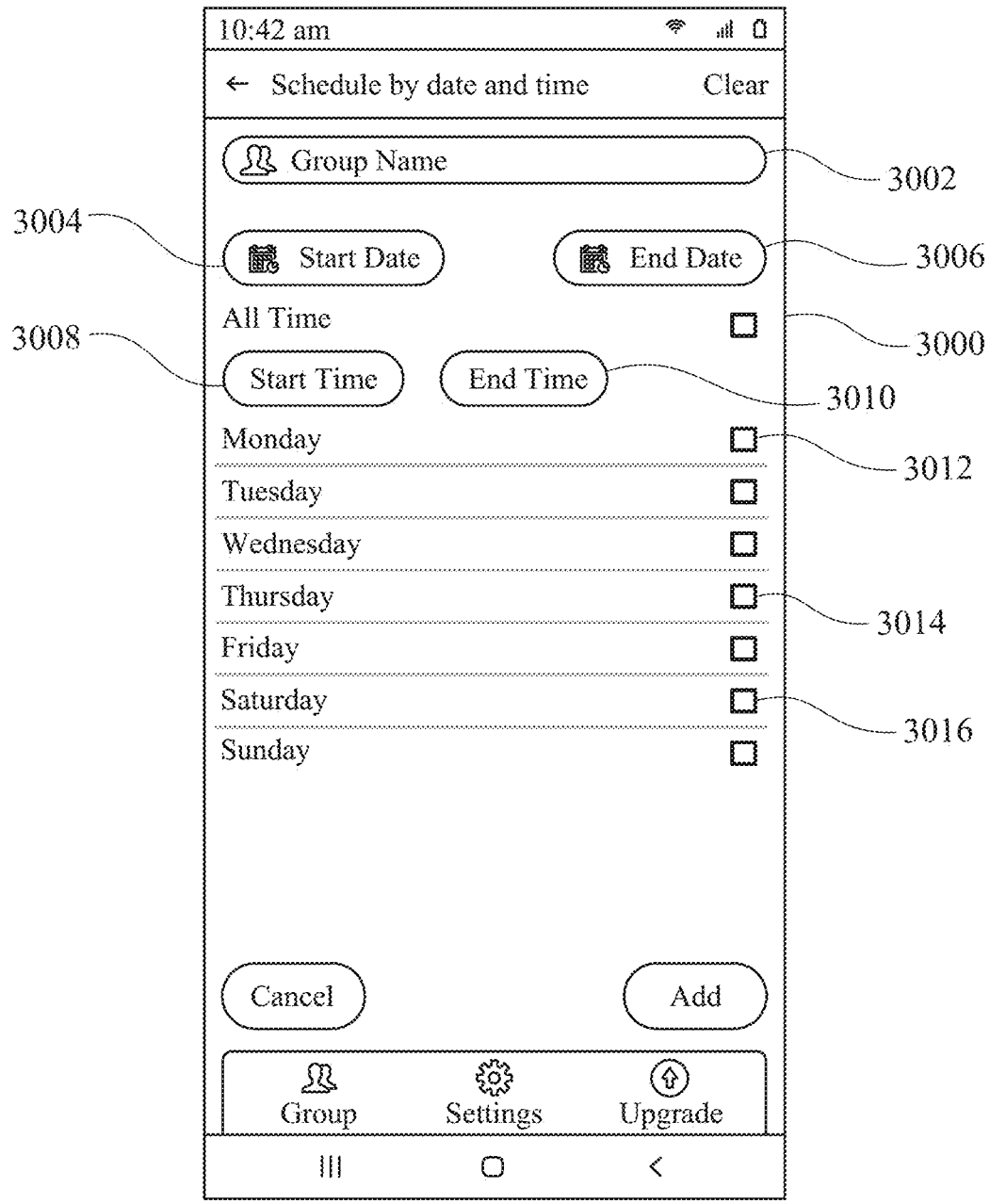
FIG. 14 presents a screen shot of a schedule by date and time page upon selecting the date and time operator in FIG. 12 to customize dates, days, and/or times for end-users to receive or prevent from receiving, incoming calls.

Upon selecting location icon 1014, end-users are directed to a schedule by location page 2000 shown in FIG. 10. The schedule by location page 2000 includes a header 2002 that identifies the prestored group considered for setting-up a schedule filter. In one embodiment, a drop-down can be included to allow end-users to view and individually select phone numbers associated with individuals that are listed in the group represented. A map 2004 of the geographical region associated with the location of the end-user is provided on the screen display of the end user's electronic device 112. A geographical location marker 2006, associated with a global positioning system (GPS) embedded in end-user electronic devices 112, indicates the current geographical location of end-users while physically located within the geographical region. A geographical range selector 2008 allows end-users to customize the geographical distance between callers and end-users for filtering incoming calls based on the location of the originating caller, and/or the geographic location of the end-user. Thus, incoming calls from known, verified callers that originate outside the geographical range or distance selected are filtered by routing such calls to the voicemail prompt 122 for review later. For instance, as illustrated in FIG. 13, end-users may customize a filtered geographical range of 2 miles where incoming calls from known, verified callers that originate within a 2 mile radius of the end-user's geographical position, (represented by a circular gray zone in FIG. 13) are granted immediate access to end-user devices 112 where incoming calls that originate from outside the 2 mile radius are filtered or blocked and routed to the voicemail prompt 122. The geographical range selector 2008 is adjustable to increase or decrease the geographical range of filtering. Upon customizing the geographical range filter, end-users save the information via, an add icon 2010. Although the geographical range selector 2008 is shown as a sliding operator, such selector 2008 may comprise one or more rotating wheels, or a check-box selection of predefined ranges. It is understood in one embodiment, end-users can customize geographical ranges or locations for individual callers, and/or groups of callers. All incoming calls that are unknown and/or unverified and that originate from any geographical location, whether inside or outside of the customized geographical range, are either immediately dropped as a result of being listed on the blacklist, or routed to the dynamic query engine 124 for further vetting. Further, end-users can select a geographic range in which to receive incoming calls based on the geographic location of the end-user. For instance, an end-user may be at home and desires to receive incoming calls from members of a designated group or family, that were created via, the group page 908, when the end-user in within a certain geographic range from the home. Thus, if an end-user selects a geographic range of say 10 miles, via range selector 2008, and the end-user is physically at a residence, then the end-user will receive incoming calls from members of the group or family when the end-user is physically located within 10 miles of the residence. Coordinates provided by the global positioning system (GPS) embedded in end-user electronic devices, i.e. smart phones, provides the geographic reference to determine the present location of the end-user at all times. If the end-user is physically located outside the selected 10-mile range, the incoming calls are routed to the voice prompt/greeting 122. It is noted that a geographic algorithm may be implemented to determine and process correlation of geographic ranges selected and physical geographic location of end-users.

In one embodiment, there is also provided another schedule filter based on country of origin, states, and/or cities. End-users may block or prevent receiving incoming calls that originate from certain countries, states and/or cities. A drop down menu listing a host of countries, states and/or cities is made available to end-users via the NCF APP, to allow end-users to easily and quickly select what countries, states and/or cities they wish to block originating calls from. Calls originating from other countries, states and/or cities generally include different area country, state or city codes provided in the telephone number associated with the incoming call. Such country, state and/or city codes may be processed to determine their origin and whether such origins were selected as blocked by end-users. Incoming calls deemed to be from a blocked country, state or city, is routed to the voice prompt 122, or to the dynamic query engine 124.

A date and time schedule filter allows end-users to schedule incoming calls, previously stored on the whitelist, based on dates, or days of a week, and times. Upon selecting the date and time icon 1016 shown on schedule overlay page 1012 of FIG. 12, end-users are directed to a schedule by date and time page 3000 illustrated in FIG. 14. The schedule date and time page 3000 includes a header 3002 identifying a previously created group, or individuals in the group, considered for setting-up a date and time schedule filter. In one embodiment, a drop-down operator may allow end-users to view and individually select phone numbers associated with known, verified individuals that were prestored earlier. End-users can customize receiving incoming calls from known, verified callers in accordance with a start date 3004, and an end date 3006, and a start time 3008, and an end time 3010. Thus, in one example, end-users may select a start date of Jun. 1, 2020, and an end date of Jun. 7, 2020, with a start time of 3 pm and end time of 11 pm for each date range. A calendar system is presented to users upon activating the start and end date icons 3004, 3006, and a time system illustrated as hour and minute is presented to users upon activating the start and end time icons 3008, and 3010. End-users can also block receiving calls based on particular days of the week as illustrated at 3012, 3014, and 3016. For example, end-users may wish to block calls on Monday 3012, Thursday 3014, and Saturday 3016 by checking the corresponding box associated with each day of the week. For instance, an end-user may wish to block calls on Monday 3012 from 3 pm to 5 pm. The ability to block incoming calls based on dates, days of the weeks, and times provides a convenient tool for end-users that wish not be bothered by calls for various reasons including for example, while at the doctor's office, while attending a religious ceremony, while driving on route, or during a business meeting. Incoming calls that occur outside prescheduled dates, days, and times are routed to the voicemail prompt 122. Incoming calls listed on the blacklist are immediately dropped, and incoming calls from unknown and unverified individuals are routed to the dynamic query engine 124 for further vetting.

Figure 15:
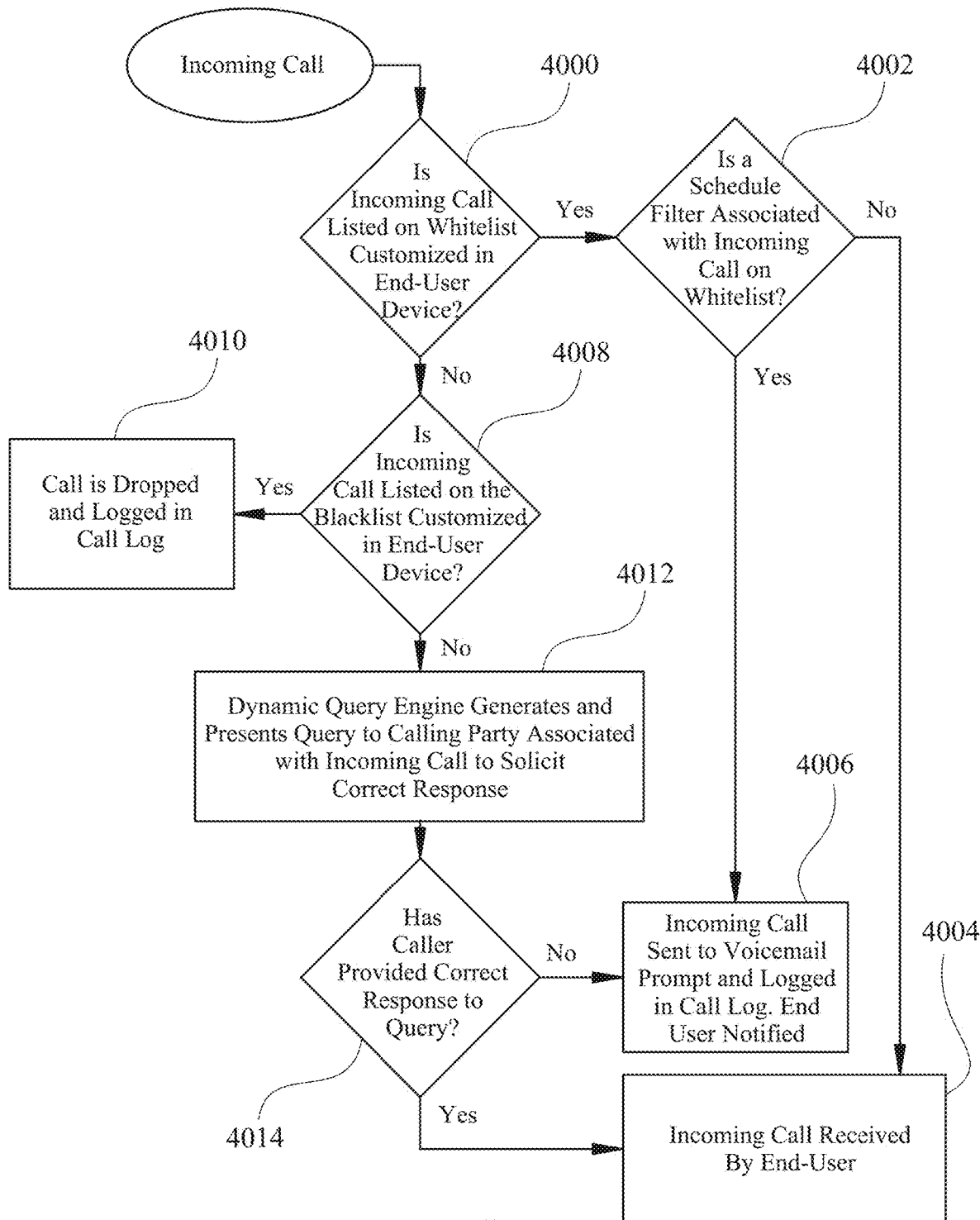
FIG. 15 presents an illustrative flow chart for processing and managing incoming calls based on user-customized schedule filters, and call lists.

A non-limiting process or method of filtering incoming calls and/or texts directed at end-user devices 112 is illustrated in FIG. 15. The process or method is operatively illustrated in reference to a single incoming call and/or text, however, it is generally understood the process and method functions for all incoming calls and/or texts. As demonstrated in step 4000, an incoming call and/or text is processed to determine whether the incoming call or text is one that was preprogrammed or prestored on an end-user customized whitelist. If the incoming call or text is listed on a customized whitelist, determination is made as to whether the end-user has created and associated a schedule filer attributed to the incoming call as illustrated in step 4002. A scheduled filter may include filtering incoming known, or verified calls based on geographic location of originating incoming call, or on date, day of the week, and time. If an end-user has not created a scheduled filter for the incoming call or text, the incoming call and/or text is forwarded and granted access to the calling end-user device 112, as shown in step 4004. However, if the end-user has generated a scheduled filter per the steps outlined in FIGS. 11-14, the incoming call and or text is processed in accordance with the customized generated schedule filter, and routed to the voicemail prompt 122, logged in a call log, and the end-user is notified of the call or text, as provided in step 4006.

As demonstrated in step 4008, an incoming call and/or text is processed to determine whether the incoming call or text is one that was preprogrammed or prestored on an end-user customized blacklist. If the incoming call or text is listed on a customized blacklist, the incoming call is immediately dropped, and recorded in a call log, as provided in step 4010. However, if the incoming call is not listed on a whitelist, and is not listed on a black list, the incoming call is routed to the dynamic query engine 124, where one or more queries are presented to the caller to solicit a correct, human response in order to ascertain whether the caller is human, or comprises a possible robocaller, as shown in step 4012. If the caller, associated with the incoming call, provides correct responses to one or more queries represented to the caller, as shown in step 4014, a determination is made that the caller is human, and the call is forwarded to the end-user at step 4004. Determining whether the incoming calls is made from a human may, in one embodiment, entail consideration as to how many solicited answers are correct, the length of time it takes to answer one or more questions, analyzing the audible tone of the response, the type of answer given by the caller, and other possible factors. If the caller, associated with the incoming call, provides an incorrect response to a predetermined number of questions, the incoming call is directed or routed to the voicemail prompt 122, the call is logged in the call log, and notice is provided to the end-user called recipient.

All incoming calls are listed in a call log and available for review to ascertain what incoming calls, if any, are associated with robocallers or spoofed calls. Each incoming call stored in the call log is stamped with a date and time the calls were initiated. Calls determined to have been made from robocallers may be manually selected via, 414 in FIG. 5, or automatically stored on the blacklist page 400. A machine-learning module may be employed to learn the frequency, pattern, originating location of, length of rings, identification of calling number, to ascertain whether incoming calls are ones made from robocallers. The machine-learning module may automatically place the incoming call in the blacklist.

Returning to FIG. 3, dashboard page 300 includes additional operators identified for example as settings, notification, billing, share this app, feedback, help and log out. The settings operator allows end-users to edit or create profile and account information, and the notification operator allows end-users to set-up notifications after certain events have occurred such as when incoming calls are routed to the voicemail prompt 122. End-users may customize the manner in which notifications are made including being able to select a visual indicator via, email or text, a visual symbol or character, or an audible indicator comprising music, a single ring, a buzzer, a charm or other sounding format. End-users can share the NCF APP with others via the share operator, and can make payments for services provided via, the billing operator. End-users can provide feedback to help improve or comment on, the NCF APP, and can initiate the help tab to access written, audible or video formats of information to assist end-users in using and navigating the NCF APP. Finally, end-users can safely log-out of the system via, the log-out operator. It is understood dashboard page 300 may include additional operators associated with other functionalities to further accommodate end-users. For instance, a language selector operator may allow users to interact with the NCF APP in a preferred language such as English, French, Japanese, may include a filter that allows receiving incoming calls from individuals subscribed to the same cell phone service as end-users, and may include options for end-users to customize how or where to route unwanted calls.

The user-customized call filtering system and method 100 is designed to support a plug-in architecture that includes add-ons, extensions, file or folder extensions or manifests, software code, or components for adding, removing, and/or changing, user-specific functionalities, and to address the need for software updates, modifications, or other changes that may be required from time to time.

Since many modifications, variations, and changes in detail can be made to the described preferred embodiments of the invention, it is intended that all matters in the foregoing description and shown in the accompanying drawings be interpreted as illustrative and not as limiting. Furthermore, it is understood that any of the features presented in the embodiments may be integrated into any other embodiments unless explicitly stated otherwise.

What is claimed is:

1. A user-customized method of filtering calls, said method comprising:
hosting a user-customized call filter application platform on a cloud-based system;
wherein the call filter application software is stored in a computer-readable memory and executed by one or more processors on one or more servers communicating with databases;
wherein the cloud system receives incoming call requests, generated by calling devices over a communication network, to communicate with end-user devices including a call filter native application;
wherein the incoming call requests are associated with telephone numbers generated by the calling devices;
wherein end-users customize the call filter native application to create call lists including prestored telephone numbers that are compared to incoming call requests to filter the incoming call requests;
wherein the method includes a schedule filter associated with one of the call lists for selectively receiving incoming calls based on a geographic location of the calling devices, based on end-users, or based on a date and time, and a dynamic query engine that generates a verification filter presented to callers associated with the incoming call requests that do not correspond to telephone numbers on the call list to solicit verified human responses from callers to selectively allow communication access of one or more incoming call requests to end-user devices;

and wherein incoming call requests corresponding to telephone numbers provided in one of the call lists are immediately terminated and logged in a call log.

2. The method of claim 1, wherein the calling devices include a telephonic communication device including a smart phone, a mobile phone, a landline phone, VOIP, or a cell phone.

3. The method of claim 1, wherein a schedule filter associated with a geographic location includes a geographic range selection that allows end-users to select a geographic range in which to receive incoming call requests that are known and verified, and that originate within the selected geographic range, and/or that allows end-users to select a geographic range in which to receive incoming calls from designated group or family members when end-users are within the selected geographic range of the end-users' geographic location.

4. The method of claim 3, wherein another schedule filter associated with a geographical location allows end-users to block or restrict incoming calls from various countries, states or cities.

5. The method of claim 1, wherein a schedule filter associated with a date and time includes a date and time selection that allows end-users to select a date and time in which to receive incoming call requests that are known and verified, and that originate within the date and time selected.

6. The method of claim 1, wherein a schedule filter associated with a date and time includes a date and time selection that allows end-users to select a date and time in which not to receive incoming call requests that are known and verified, and that originate within the date and time selected.

7. The method of claim 1, wherein the call lists include a blacklist including telephone numbers associated with incoming calls that are deemed unwanted and unverified, and a whitelist including telephone numbers associated with incoming calls that are deemed wanted, and verified.

8. The method of claim 1, wherein the dynamic query engine includes any of: 1) a question and answer filter in which callers are asked one or more questions and callers given answers are compared to correct answers prestored in one or more look-up tables; 2) a mathematical computation challenge in which callers are asked to solve one or more mathematical problems; 3) a phrase, sentence, word, numbers, or letters recognition filter in which callers are asked to repeat certain phrases, sentences, words, numbers or letters when prompted; and 4) a caller directive option employed to instruct callers to perform a certain task.

9. The method of claim 1, wherein the call filter native application includes a host of pages presented to end-users including a sign-in page, a dashboard page, a blacklist page, a whitelist page, a black list overlay page including operators associated with a contacts page, a call log page, a message log page, a from input page, a number contains page, and a message contains text page, a group page, a schedule page, a schedule overlay page including operators for a schedule filter associated with a geographic location page, and a date and time page.

10. The method of claim 1, wherein the geographic location page includes a geographic selector adjustable by end-users for selectively adjusting a geographic range to receive incoming call requests that originate within the selected geographic range, and/or receive incoming calls from group and/or family members when end-users are within a selected geographic range of end-users geographic location.

11. The method of claim 1, wherein the dashboard page includes functionalities associated with a blacklist, a whitelist, a call log, a schedule filter, a group, settings, notification, billing, share this application, feedback, help and logout.

12. The method of claim 1, wherein the method includes creating a voicemail greeting stored in a voicemail prompt database where incoming call requests are selectively routed to the voicemail greeting upon callers associated with incoming call requests correctly providing answers to queries generated from said dynamic engine, upon incoming call requests corresponding to telephone numbers provided in said whitelist and not associated with a schedule filter, or upon incoming call requests corresponding to telephone numbers provided in said whitelist, and satisfying rules of a created schedule filter.

13. A user-customized call filter system for filtering unwanted calls, said system comprising:
a cloud system hosting a user-customized call filter application platform stored in a computer-readable memory and executed by one or more processors on one or more servers and including databases and a dynamic query engine;
wherein the cloud system receives requests, generated by calling devices over a communication network, to communicate with end-user devices;
wherein the requests comprise signals representing telephone numbers associated with the calling devices;
wherein the user-customized call filter application communicates with a native call filter app provided on the end-user devices for comparing telephone numbers of incoming calls to telephone numbers prestored in call lists to selectively allow the calling devices to communicate with the end-user devices;
wherein the dynamic query engine generates at least one verification filter that is presented to callers associated with the calling devices to solicit a verified human response from the callers to selectively allow communication access of the calling devices to the called devices upon receiving a correct response to the verification filter, and immediately terminating incoming calls upon receiving an incorrect response to the verification filter.

14. A user-customized call filter system for filtering unwanted calls, said system comprising: a cloud system hosting a user-customized call filter application platform stored in a computer-readable memory and executed by one or more processors on one or more servers and including databases and a dynamic query engine;
wherein the cloud system receives requests, generated by calling devices over a communication network, to communicate with end-user devices;
wherein the requests comprise signals representing telephone numbers associated with the calling devices;
wherein the user-customized call filter application communicates with a native call filter app provided on the end-user devices for comparing telephone numbers of incoming calls to telephone numbers prestored in call lists to selectively allow the calling devices to communicate with the end-user devices;

wherein the dynamic query engine generates at least one verification filter that is presented to callers associated with the calling devices to solicit a verified human response from the callers to selectively allow communication access of the calling devices to the called devices upon receiving a correct response to the verification filter, and immediately terminating incoming calls upon receiving an incorrect response to the verification filter;

wherein the system is assembled to be capable of executing a method of:

hosting a user-customized call filter application platform on a cloud-based system;

wherein the call filter application software is stored in a computer-readable memory and executed by one or more processors on one or more servers communicating with databases;

wherein the cloud system receives incoming call requests, generated by calling devices over a communication network, to communicate with end-user devices including a call filter native application;

wherein the incoming call requests are associated with telephone numbers generated by the calling devices;

wherein end-users customize the call filter native application to create call lists including prestored telephone numbers that are compared to incoming call requests to filter the incoming call requests;

wherein the method includes a schedule filter associated with one of the call lists for selectively receiving incoming calls based on a geographic location of the calling devices, based on end-users, or based on a date and time, and a dynamic query engine that generates a verification filter presented to callers associated with the incoming call requests that do not correspond to telephone numbers on the call list to solicit verified human responses from callers to selectively allow communication access of one or more incoming call requests to end-user devices;

and wherein incoming call requests corresponding to telephone numbers provided in one of the call lists are immediately terminated and logged in a call log.

15. The method of claim 14, wherein the calling devices include a telephonic communication device including a smart phone, a mobile phone, a landline phone, VOIP, or a cell phone.

16. The method of claim 14, wherein a schedule filter associated with a geographic location includes a geographic range selection that allows end-users to select a geographic range in which to receive incoming call requests that are known and verified, and that originate within the selected geographic range, and/or that allows end-users to select a geographic range in which to receive incoming calls from designated group or family members when end-users are within the selected geographic range of the end-users' geographic location.

17. The method of claim 16, wherein another schedule filter associated with a geographical location allows end-users to block or restrict incoming calls from various countries, states or cities.

18. The method of claim 14, wherein a schedule filter associated with a date and time includes a date and time selection that allows end-users to select a date and time in which to receive incoming call requests that are known and verified, and that originate within the date and time selected.

19. The method of claim 14, wherein a schedule filter associated with a date and time includes a date and time selection that allows end-users to select a date and time in which not to receive incoming call requests that are known and verified, and that originate within the date and time selected.

20. The method of claim 14, wherein the call lists include a blacklist including telephone numbers associated with incoming calls that are deemed unwanted and unverified, and a whitelist including telephone numbers associated with incoming calls that are deemed wanted, and verified.

* * * * *